(12) United States Patent
Yoshiya

(10) Patent No.: US 10,618,553 B2
(45) Date of Patent: Apr. 14, 2020

(54) TORQUE SENSOR

(71) Applicant: Melexis Technologies SA, Bevaix (CH)

(72) Inventor: Takumi Yoshiya, Tokyo (JP)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 15/916,478

(22) Filed: Mar. 9, 2018

(65) Prior Publication Data

US 2018/0265125 A1    Sep. 20, 2018

(30) Foreign Application Priority Data

Mar. 16, 2017   (JP) .................. 2017-051103

(51) Int. Cl.
| | |
|---|---|
| *G01L 1/00* | (2006.01) |
| *B62D 6/10* | (2006.01) |
| *G01L 5/22* | (2006.01) |
| *G01L 3/10* | (2006.01) |
| *B62D 5/04* | (2006.01) |

(52) U.S. Cl.
CPC .............. *B62D 6/10* (2013.01); *B62D 5/0463* (2013.01); *B62D 5/0481* (2013.01); *G01L 3/103* (2013.01); *G01L 3/104* (2013.01); *G01L 5/221* (2013.01)

(58) Field of Classification Search
CPC ....................................................... B62D 6/10
See application file for complete search history.

(56) References Cited

U.S. PATENT DOCUMENTS

| | | | | |
|---|---|---|---|---|
| 4,185,265 | A * | 1/1980 | Griffin | ............. G08G 1/096716 324/226 |
| 6,972,715 | B2 * | 12/2005 | Hollis | ..................... B63C 11/26 342/357.57 |
| 9,689,763 | B2 | 6/2017 | Takahashi et al. | |
| 2004/0074316 | A1 * | 4/2004 | Nakane | ................... G01L 5/221 73/862.333 |
| 2010/0005909 | A1 * | 1/2010 | Antoni | ..................... G01L 5/221 73/862.325 |
| 2015/0369679 | A1 | 12/2015 | Ishimoto | |
| 2016/0153850 | A1 | 6/2016 | Takahashi et al. | |
| 2016/0214648 | A1 | 7/2016 | Schoepe et al. | |

(Continued)

FOREIGN PATENT DOCUMENTS

| | | |
|---|---|---|
| DE | 102007057050 A1 | 7/2008 |
| EP | 1424541 A2 | 6/2004 |

(Continued)

OTHER PUBLICATIONS

Extended European Search Report from EP Application No. EP 18160715.1, dated Jun. 25, 2018.

(Continued)

*Primary Examiner* — Jamel E Williams
(74) *Attorney, Agent, or Firm* — Workman Nydegger

(57) ABSTRACT

A torque sensor for sensing the torque applied to a first shaft has a multipolar magnet rotated therewith and is connected to a second shaft via a torsion bar. The torque sensor includes a pair of magnetic yokes adapted to be disposed in a magnetic field of the multipolar magnet and adapted to be rotated together with the second shaft. A magnetic detection element has a detection surface and is capable of detecting a magnetic flux in a direction parallel to the detection surface.

15 Claims, 18 Drawing Sheets

(56) References Cited

U.S. PATENT DOCUMENTS

2017/0108411 A1\* 4/2017 Komuro ................ B60W 30/02
2018/0031392 A1 2/2018 Yoshiya

FOREIGN PATENT DOCUMENTS

| JP | 2012237728 A | | 12/2012 |
|----|--------------|---|---------|
| JP | 2013195108 A | | 9/2013 |
| JP | 2016003984 A | | 1/2016 |
| JP | 2016102671 A | * | 6/2016 |
| JP | 2016102671 A | | 6/2016 |
| JP | 2016102672 A | | 6/2016 |
| JP | 2016156682 A | | 9/2016 |
| WO | 2014012893 A2 | | 1/2014 |

OTHER PUBLICATIONS

Japanese Office Action from JP Application No. 2017-051103, dated Jul. 2, 2018.

\* cited by examiner

TORQUE SENSOR

TECHNICAL FIELD OF THE INVENTION

The present invention relates to a torque sensor and to a method for controlling a torque.

BACKGROUND OF THE INVENTION

As a conventional technique, a torque sensor for detecting a torque applied to a steering shaft by using a magnet and a magnetic sensor has been proposed (for example, refer to Patent Literature 1).

The torque sensor disclosed in Patent Literature 1 is provided at a connecting portion between a steering shaft connected with a steering wheel operated by a driver and a column shaft connected with the steering shaft through a torsion bar, and includes a cylindrical multipolar magnet connected to a steering shaft, a pair of magnetic yokes disposed within the magnetic field of the multipolar magnet and integrally rotated with the column shaft, a pair of magnetism collecting elements magnetically coupled to the pair of magnetic yokes, and a Hall IC for detecting a magnetic flux density, and the torque sensor detects a torque applied to the steering shaft by means of arrangement of a Hall IC between protrusions provided in each of the pair of magnetism collecting elements and detection of the magnetic flux density between the pair of magnetic yokes, by using the fact that when the torsion bar is twisted and deformed according to the torque applied to the steering shaft, the relative position between the multipolar magnet and the pair of magnetic yokes changes so that the magnetic flux density generated between the pair of magnetic yokes changes. Information on the detected torque is sent to an electric control unit (ECU), and the ECU sends a signal for controlling the assisting force applied to the column shaft to an assist mechanism that is connected to the column shaft and assists the driver's steering.

Here, as shown in FIGS. 18, 19(*a*) and 19(*b*), when the Hall IC 10*w* is mounted on a substrate (not shown) by the lead wire 11*w*, the minimum value of the distance Dw between the protrusions 13*c* and 14*c* provided on each of the pair of magnetism collecting elements is the thickness of the Hall IC 10*w* (for example, 1.5 mm). The Hall plate 100*w* of the Hall IC 10*w* is disposed between the protrusions 13*c* and 14*c* of the magnetism collecting elements so that the magnetic flux density between the pair of magnetic yokes can be detected more greatly and the distance Dw between the protrusions 13*c* and 14*c* of the magnetism collecting elements is made as small as possible so that magnetic flux density to be detected is maximized.

Further, as shown in FIG. 20 and FIGS. 21(*a*) and 21(*b*), there are cases where surface mounting of the Hall IC 10*x* on the substrate 11*x* is required when constructing the torque sensor. In this case, the minimum value of the distance Dx between the protrusions 13*c* and 14*c* provided on each of the pair of magnetism collecting elements becomes equal to the combined thickness of the thickness of the Hall IC 10*x* (for example, 1.5 mm) and the thickness of the substrate 11*x* (for example, 1.1 mm). Since the Hall plate 100*x* of the Hall IC 10*x* is disposed between the protrusions 13*c* and 14*c* of the magnetism collecting elements, the magnetic flux density between the pair of magnetic yokes is detected more greatly, but the distance Dx between the protrusions 13*c* and 14*c* of the magnetism collecting elements is increased by the thickness of the substrate 11*x* as compared with the distance Dw, and the magnetic flux density to be detected is reduced.

As a solution to the above problem, a torque sensor having a notch in a substrate has been proposed (for example, Patent Literatures 2, 3, and 4).

As shown in FIGS. 22, 23(*a*) and 23(*b*), the torque sensor disclosed in Patent Literatures 2, 3, and 4 is provided with a notch 110*y* on the substrate fly, and the protrusion 14*c* of the magnetism collecting element is arranged in the space formed by the notch 110*y*, whereby the minimum value of the distance Dy between the protrusions 13*c* and 14*c* of the magnetism collecting elements is set to the thickness of the Hall IC 10*y* (for example, 1.5 mm). The Hall plate 100*y* of the Hall IC 10*y* is disposed between the protrusions 13*c* and 14*c* of the magnetism collecting elements whose interval has been narrowed so that the magnetic flux density between the pair of magnetic yokes is detected more greatly and the distance Dy between protrusions 13*c* and 14*c* of the magnetism collecting elements is made substantially equal to the distance Dw, thereby maximizing the magnetic flux density to be detected.

As shown in FIGS. 24, 25(*a*) and 25(*b*), when the torque sensor is made, the Hall IC 10*z* is subjected to surface mounting on the substrate 11*z*, and in addition, a molding with a sealing material 12*z* is sometimes required.

CITATION LIST

Patent Literature

Patent Literature 1: JP 2012-237728 A
Patent Literature 2: JP 2016-3984 A
Patent Literature 3: JP 2016-102671 A
Patent Literature 4: JP 2016-102672 A

SUMMARY OF THE INVENTION

Technical Problem

In this case, the minimum value of the distance Dz between the protrusions 13*c* and 14*c* provided in each of the pair of magnetism collecting elements becomes equal to the sum of the thicknesses of the Hall IC 10*z* (for example, 1.5 mm), substrate 11*z* (for example, 1.1 mm) and sealing material 12*z* (for example, 2 mm). The Hall plate 100*z* of the Hall IC 10*z* is disposed between the protrusions 13*c* and 14*c* of the magnetism collecting elements so as to detect the magnetic flux density between the pair of magnetic yokes to a greater extent, but there is a problem that the magnetic flux density to be detected decreases because the distance Dz between the protrusions 13*c* and 14*c* of the magnetism collecting elements is larger than the distance Dw by the thickness of the substrate llz and the sealing material 12*z*.

Even if the Hall IC and the substrate of the torque sensor shown in Patent Literatures 2, 3 and 4 is molded with a sealing material, there is a problem that although the thickness of the substrate is ignorable with respect to the distance between the protrusions 13*c* and 14*c* of the magnetism collecting elements, at least the thickness of the sealing material is not ignorable.

Accordingly, an object of the present invention is to provide a torque sensor in which the thicknesses of the magnetic detection element and a material for mounting the magnetic detection element do not affect the detection sensitivity of the magnetic flux.

Solution to Problem

A first aspect of the present invention provides the following torque sensor in order to achieve the above object. A second aspect of the present invention provides a method for controlling a torque, said method being associated with an embodiment of the torque sensor according to the first aspect. A third aspect of the present invention provides a signal processing unit adapted to perform the method of the second aspect.

In the first aspect, the present invention relates to a torque sensor for sensing the torque applied to a first shaft having a multipolar magnet rotated therewith and being connected to a second shaft via a torsion bar, the torque sensor comprising:
a pair of magnetic yokes adapted to be disposed in a magnetic field of the multipolar magnet and adapted to be rotated together with the second shaft, and
a magnetic detection element having a detection surface and being capable of detecting a magnetic flux in a direction parallel to the detection surface.

In embodiments of the first aspect, the pair of magnetic yokes may be capable of having a first magnetic flux generated between the yokes when torque is applied to the first shaft and the torsion bar is twisted, and the magnetic detection element may be adapted to detect the first magnetic flux.

In embodiments, the torque sensor may further comprise a pair of magnetism collectors capable of collecting a first magnetic flux generated between the pair of magnetic yokes. The pair of magnetism collectors may have a pair of magnetism collector bodies for collecting the first magnetic flux and may have a pair of protrusions that each extend from each of the pair of magnetism collector bodies to form a gap; wherein a second magnetic flux is induced in the gap when the first magnetic flux is present between the pair of magnetic yokes, and the magnetic detection element may be adapted to detect the first magnetic flux indirectly by detecting the second magnetic flux. The pair of protrusions may be substantially parallel to the detection surface and/or are substantially aligned. By "aligned" it is meant that a first protrusion of the pair is in the prolongation of a second protrusion of the pair. The protrusions may each extend substantially perpendicularly from each of the pair of magnetism collector bodies. In embodiments, the protrusions may each extend at an angle of from 85 to 95° C., preferably from 87 to 93°, more preferably 89 to 91° and most preferably 90° from each of the pair of magnetism collector bodies. The protrusions may each extend from each of the pair of magnetism collector bodies in an axial direction of the first shaft when the pair of magnetic yokes is rotated together with the second shaft.

In embodiments, the magnetic detection element may be adapted to be disposed, so that a normal line of a detection surface of the magnetic detection element is in a radial direction of the first shaft, so as to be located between the pair of magnetic yokes in a first plane view, a normal line of the first plane being in the radial direction of the first shaft, and so as not to overlap the pair of magnetic yokes in a second plane view, a normal line of the second plane being in an axial direction of the first shaft.

In embodiments, the magnetic detection element may include at least a pair of Hall plates arranged at an interval; and a magnetic concentrator overlapping a part of each of the pair of Hall plates in a plane view in a normal direction of the detection surface. The magnetic concentrator may for instance be provided between the pair of Hall plates so as to overlap a part of each of the pair of Hall plates in a plane view in a normal direction of the detection surface. The magnetic detection element may further include a magnetic concentrator at each end of the pair of Hall plates in a plane view in the normal direction of the detection surface.

In alternative embodiments, the magnetic detection element may include at least a pair of Hall plates arranged side by side, and a magnetic concentrator provided at each end of the pair of Hall plates so as to overlap a part of each of the pair of Hall plates in a plane view in a normal direction of the detection surface.

In other alternative embodiments, the magnetic detection element may include a Hall plate or an MR element, whose detection direction is parallel to the detection surface.

In any embodiments, the torque sensor may further comprise the multipolar magnet. The multipolar magnet may have S-poles and N-poles alternately arranged at a predetermined pitch in a circumferential direction of the first shaft when the multipolar magnet is rotated with the first shaft. The pair of magnetic yokes may be arranged to be shifted from each other by the predetermined pitch in the circumferential direction.

Expressed differently, the torque sensor of the first aspect may comprise:
a pair of magnetic yokes rotatable together with the second shaft and adapted to be disposed in a magnetic field of a multipolar magnet;
optionally, a pair of magnetism collectors having a pair of magnetism collector bodies for collecting the first magnetic flux and having a pair of protrusions that each extend from each of the pair of magnetism collector bodies to form a gap;
a magnetic detection element having a detection surface and being capable of detecting a magnetic flux in a direction parallel to the detection surface,
wherein the pair of magnetic yokes is capable of having a first magnetic flux generated between the yokes when torque is applied to the first shaft and the torsion bar is twisted,
wherein, when the pair of magnetism collectors is present, a second magnetic flux is induced in the gap when a first magnetic flux is present between the pair of magnetic yokes, and wherein the magnetic detection element is for detecting the first magnetic flux either directly when no pair of magnetism collectors is present, or indirectly by detecting the second magnetic flux when a pair of magnetism collectors is present.

Below are a set of numbered embodiments [1] to [18] according to the first aspect of the present invention. In the embodiments [1] to [18] below, the multipolar magnet, the pair of magnetic yokes, and the magnetic detection element will be said to be "disposed accordingly" when the multipolar magnet is rotated with the first shaft, the pair of magnetic yokes is rotated together with the second shaft and disposed in the magnetic field of the multipolar magnet, and the magnetic detection element is disposed so that a normal line of the detection surface of the magnetic detection element is in a radial direction of the first shaft.

[1] A torque sensor including:
a multipolar magnet rotated (or rotatable, e.g. if not disposed accordingly) with a first shaft;
a pair of magnetic yokes rotated (or rotatable, e.g. if not disposed accordingly) together with a second shaft connected to the first shaft via a torsion bar and disposed (or adapted to be disposed, e.g. if not disposed accordingly) in a magnetic field of the multipolar magnet;
a pair of magnetism collectors having a pair of magnetism collector bodies that collect lines of magnetic force of the pair of magnetic yokes respectively and having a pair of protrusions that each extend (when the pair of magnetic yokes is disposed accordingly) in an axial direction of the first shaft from each of the pair of magnetism collector bodies to form a gap; and a magnetic detection element which is disposed (or adapted to be disposed, e.g. if not disposed accordingly), so that a normal line of a detection surface of the magnetic detection element is in a radial direction of the first shaft, so as to face the gap of the pair of protrusions in a plane view, a normal line of the plane being in the radial direction of the first shaft, and so as not to overlap the pair of protrusions in a plane view, a normal line of the plane being in the axial direction of the first shaft, and which detects (or is capable of detecting, e.g. when disposed accordingly) a magnetic flux in the gap of the pair of protrusions.

[2] The torque sensor according to [1], wherein a magnetic detection direction of the magnetic detection element is the axial direction of the first shaft (when the magnetic detection element is disposed accordingly).

[3] The torque sensor according to [1] or [2], wherein the magnetic detection element includes:

at least a pair of Hall plates arranged at an interval (and, when the magnetic detection element is disposed accordingly,) in the axial direction of the first shaft; and a magnetic concentrator provided between the pair of Hall plates so as to overlap a part of each of the pair of Hall plates in a plane view in a normal direction of the detection surface.

[4] The torque sensor according to [3], wherein the magnetic detection element further includes a magnetic concentrator at each end of the pair of Hall plates (which, when the magnetic detection element is disposed accordingly, are) in the axial direction of the first shaft in a plane view in the normal direction of the detection surface.

[5] The torque sensor according to [1] or [2], wherein the magnetic detection element includes:

at least a pair of Hall plates arranged side by side (and, when the magnetic detection element is disposed accordingly) in the axial direction of the first shaft; and a magnetic concentrator provided at each end of the pair of Hall plates (which, when the magnetic detection element is disposed accordingly, is) in the axial direction of the first shaft so as to overlap a part of each of the pair of Hall plates in a plane view in a normal direction of the detection surface.

[6] The torque sensor according to [1] or [2], wherein the magnetic detection element includes a Hall plate whose detection direction is the axial direction of the first shaft (when the magnetic detection element is disposed accordingly).

[7] The torque sensor according to [1] or [2], wherein the magnetic detection element includes an MR element whose detection direction is the axial direction of the first shaft (when the magnetic detection element is disposed accordingly).

[8] The torque sensor according to [1] or [2], wherein the magnetic detection element includes at least a pair of Hall plates arranged side by side (and, when the magnetic detection element is disposed accordingly,) in the axial direction of the first shaft, and each of the pair of protrusions of the pair of magnetism collectors is provided at each end of the pair of Hall plates, and, when the pair of magnetic yokes is disposed accordingly) in the axial direction of the first shaft so as to overlap a part of each of the pair of Hall plates in a plane view in a normal direction of the detection surface.

[9] The torque sensor according to any one of [1] to [8], wherein the multipolar magnet has S-poles and N-poles alternately arranged at a predetermined pitch in a circumferential direction of the first shaft (when the multipolar magnet is disposed accordingly), and the pair of magnetic yokes are arranged to be shifted from each other by the predetermined pitch in the circumferential direction.

[10] A torque sensor including:

a multipolar magnet rotated (or rotatable, e.g. if not disposed accordingly) with a first shaft;

a pair of magnetic yokes rotated (or rotatable, e.g. if not disposed accordingly) together with a second shaft connected to the first shaft via a torsion bar and disposed (or adapted to be disposed, e.g. if not disposed accordingly) in a magnetic field of the multipolar magnet; and a magnetic detection element which is disposed (or adapted to be disposed, e.g. if not disposed accordingly), so that a normal line of a detection surface of the magnetic detection element is in a radial direction of the first shaft, so as to be located between the pair of magnetic yokes in a plane view, a normal line of the plane being in the radial direction of the first shaft, and so as not to overlap the pair of magnetic yokes in a plane view, a normal line of the plane being in an axial direction of the first shaft, and which detects (or is capable of detecting, e.g. when not disposed accordingly) a magnetic flux between the pair of magnetic yokes.

[11] The torque sensor according to [10], wherein a magnetic detection direction of the magnetic detection element is the axial direction of the first shaft (when the magnetic detection element is disposed accordingly).

[12] The torque sensor according to [10] or [11], wherein the magnetic detection element includes:

at least a pair of Hall plates arranged at an interval (and, when the magnetic detection element is disposed accordingly,) in the axial direction of the first shaft; and a magnetic concentrator provided between the pair of Hall plates so as to overlap a part of each of the pair of Hall plates in a plane view in a normal direction of the detection surface.

[13] The torque sensor according to [12], wherein the magnetic detection element further includes a magnetic concentrator at each end of the pair of Hall plates (which, when the magnetic detection element is disposed accordingly, are) in the axial direction of the first shaft in a plane view in the normal direction of the detection surface.

[14] The torque sensor according to [10] or [11], wherein the magnetic detection element includes:

at least a pair of Hall plates arranged side by side (and, when the magnetic detection element is disposed accordingly) in the axial direction of the first shaft; and a magnetic concentrator provided at each end of the pair of Hall plates (which, when the magnetic detection element is disposed accordingly, is) in the axial direction of the first shaft so as to overlap a part of each of the pair of Hall plates in a plane view in a normal direction of the detection surface.

[15] The torque sensor according to [10] or [11], wherein the magnetic detection element includes a Hall plate whose detection direction is the axial direction of the first shaft (when the magnetic detection element is disposed accordingly).

[16] The torque sensor according to [10] or [11], wherein the magnetic detection element includes an MR element whose detection direction is the axial direction of the first shaft (when the magnetic detection element is disposed accordingly).

[17] The torque sensor according to any one of [10] to [16], wherein
the multipolar magnet has S-poles and N-poles alternately arranged at a predetermined pitch in a circumferential direction of the first shaft (when the multipolar magnet is disposed accordingly), and
the pair of magnetic yokes are arranged to be shifted from each other by the predetermined pitch in the circumferential direction.

[18] The torque sensor according to any one of [10] to [17], further including a pair of magnetism collectors that collect lines of magnetic force of the pair of magnetic yokes, respectively.

Advantageous Effects of Invention

According to the invention of embodiment [1], the thickness of the magnetic detection element and a material for mounting the magnetic detection element can be prevented from affecting the detection sensitivity of the magnetic flux.

According to the invention of embodiment [2] or [11], a magnetic detection element whose magnetic detection direction is the axial direction of the first shaft can be used.

According the invention of embodiment [3] or [12], it is possible to use a magnetic detection element which has at least a pair of Hall plates arranged at an interval in the axial direction of the first shaft and a magnetic concentrator provided between the pair of Hall plates so as to overlap a part of each of the pair of Hall plates in a plane view in the normal direction of the detection surface.

According to the invention of embodiment [4] or [13], it is possible to use a magnetic detection element further having magnetic concentrators at both ends of the pair of Hall plates in the axial direction of the first shaft in a plane view in the normal direction of the detection surface.

According to the invention of embodiment [5] or [14], it is possible to use a magnetic detection element having at least a pair of Hall plates arranged side by side in the axial direction of the first shaft and a magnetic concentrator provided on each end of the pair of Hall plates in the axial direction of the first shaft so as to overlap a part of each of the pair of Hall plates in a plane view in the normal direction of the detection surface.

According to the invention of embodiment [6] or [15], a magnetic detection element having a Hall plate whose detection direction is the axial direction of the first shaft can be used.

According to the invention of embodiment [7] or [16], a magnetic detection element having an MR element whose detection direction is the axial direction of the first shaft can be used.

According to the invention of embodiment [8], a magnetic detection element having at least a pair of Hall plates arranged side by side in the axial direction of the first shaft can be used.

According to the invention of embodiment [9] or [17], it is possible to use a multipolar magnet in which S-poles and N-poles are alternately arranged at a predetermined pitch in the circumferential direction of the first shaft and a pair of magnetic yokes which are arranged to be shifted from each other by a predetermined pitch in the circumferential direction.

According to the invention of embodiment [10], it is possible to omit the magnetism collecting plate for detecting the magnetic flux between the pair of magnetic yokes spaced apart in the direction of the first shaft.

According to the invention of embodiment [18], the torque sensor can be downsized by omitting the protrusions of the magnetism collecting plates.

In a second aspect, the present invention may relate to a method for controlling a torque assisting a driver's steering of a column shaft, comprising:
receiving a first and a second signal output from a first and a second hall plate respectively, calculating the difference between the first and the second signal output, and
transferring a detection signal corresponding to this difference to an electric control unit for controlling the torque.

In embodiments, the method may further comprise, after the transferring step, a step of controlling the torque in accordance with the detection signal.

In a third aspect, the present invention may relate to a signal processing unit adapted to perform the method of the second aspect.

In a fourth aspect, the present invention may also include a computer program or computer program product which provides the functionality of any of the methods according to the present invention when executed on a computing device.

In the different figures, the same reference signs refer to the same or analogous elements.

DESCRIPTION OF ILLUSTRATIVE EMBODIMENTS

First Embodiment (Configuration of Torque Sensor)

Figure 1:
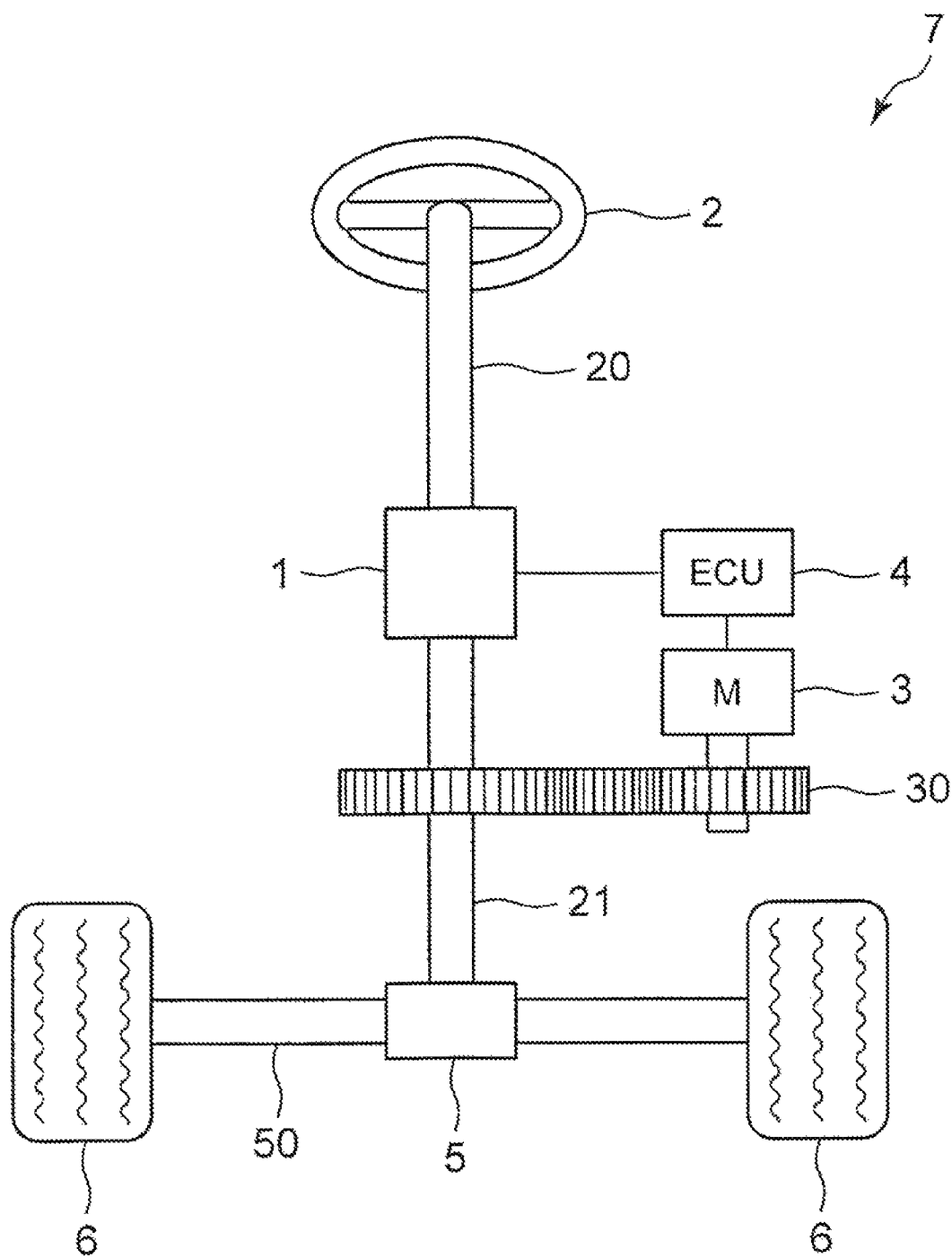
FIG. 1 is a schematic diagram showing a configuration example of a steering system according to a first embodiment.

FIG. 1 is a schematic diagram showing a configuration example of a steering system according to the first embodiment.

A steering system 7 includes a torque sensor 1 for detecting a torque applied to a steering shaft 20 which is a first shaft and outputting a detection signal, a steering wheel 2 connected to one end of the steering shaft 20, a motor 3 for outputting a torque to a column shaft 21 which is a second shaft via a reduction gear 30 to assist steering of the steering wheel 2 conducted by a driver, an electric control unit (ECU) 4 for controlling the operation of the motor 3 according to the output of the torque sensor 1, a pinion gear 5 for converting rotational motion of the column shaft 21 into linear motion of a rack shaft 50, and wheels 6 connected to the rack shaft 50 via a tie rod (not shown) or the like.

In the above configuration, when the driver rotates the steering wheel 2, the steering shaft 20 connected to the steering wheel 2 rotates. When the steering shaft 20 rotates, the column shaft 21 connected thereto via a torsion bar (22, see FIG. 2) rotates. When the column shaft 21 rotates, the rack shaft 50 is displaced via the pinion gear 5, and the angle of a pair of wheels 6 changes according to the displacement amount of the rack shaft 50.

The torque sensor 1 detects the torque of the steering shaft 20 and outputs a detection signal corresponding to the detected torque. When the detection signal of the torque sensor 1 is input, the ECU 4 controls the torque output from the motor 3 in accordance with the detection signal. The rotation of the motor 3 is decelerated by the reduction gear 30 to apply torque to the column shaft 21 to assist the driver in turning the steering wheel 2. It should be noted that the output of the motor 3 may be directly transmitted to the rack shaft 50 without passing through the column shaft 21.

Figure 2:
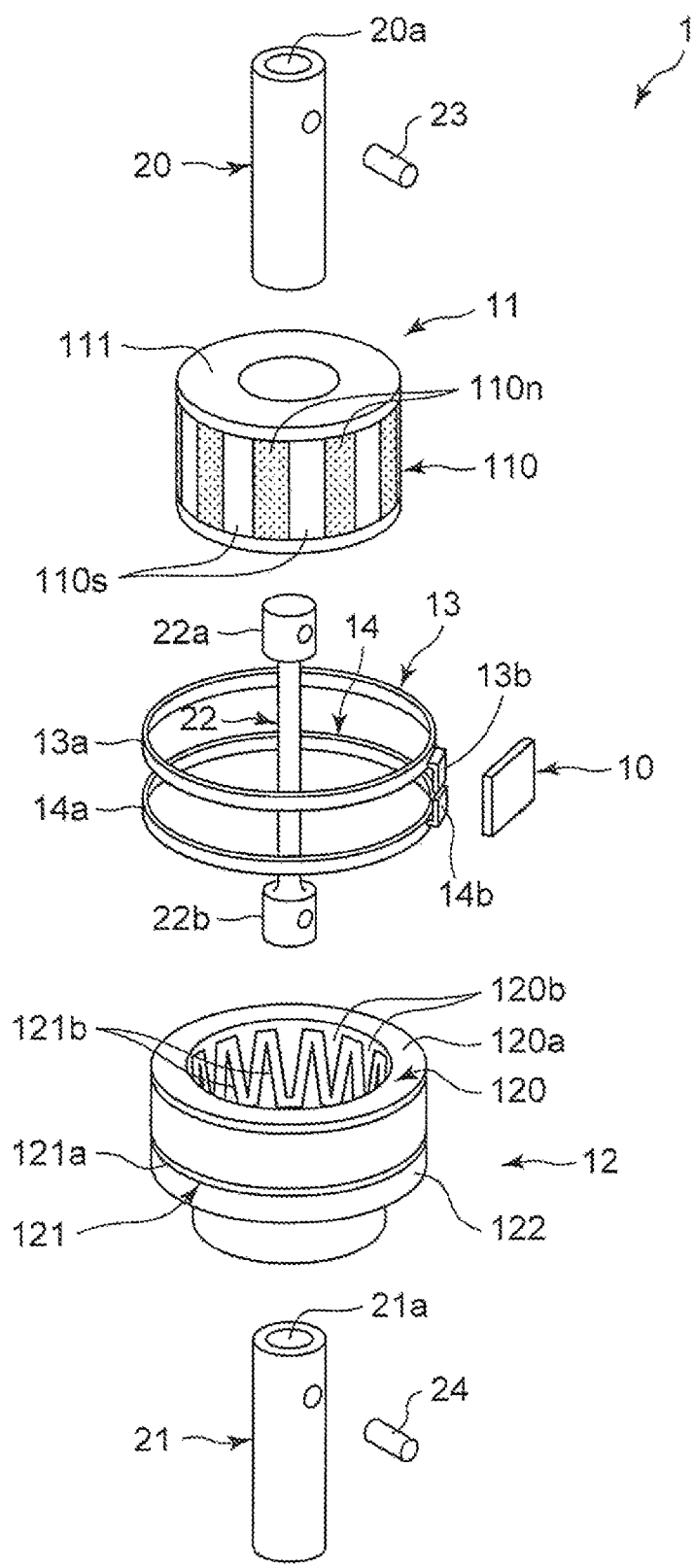
FIG. 2 is an exploded perspective view showing a configuration example of a torque sensor according to the first embodiment.
Figure 3:
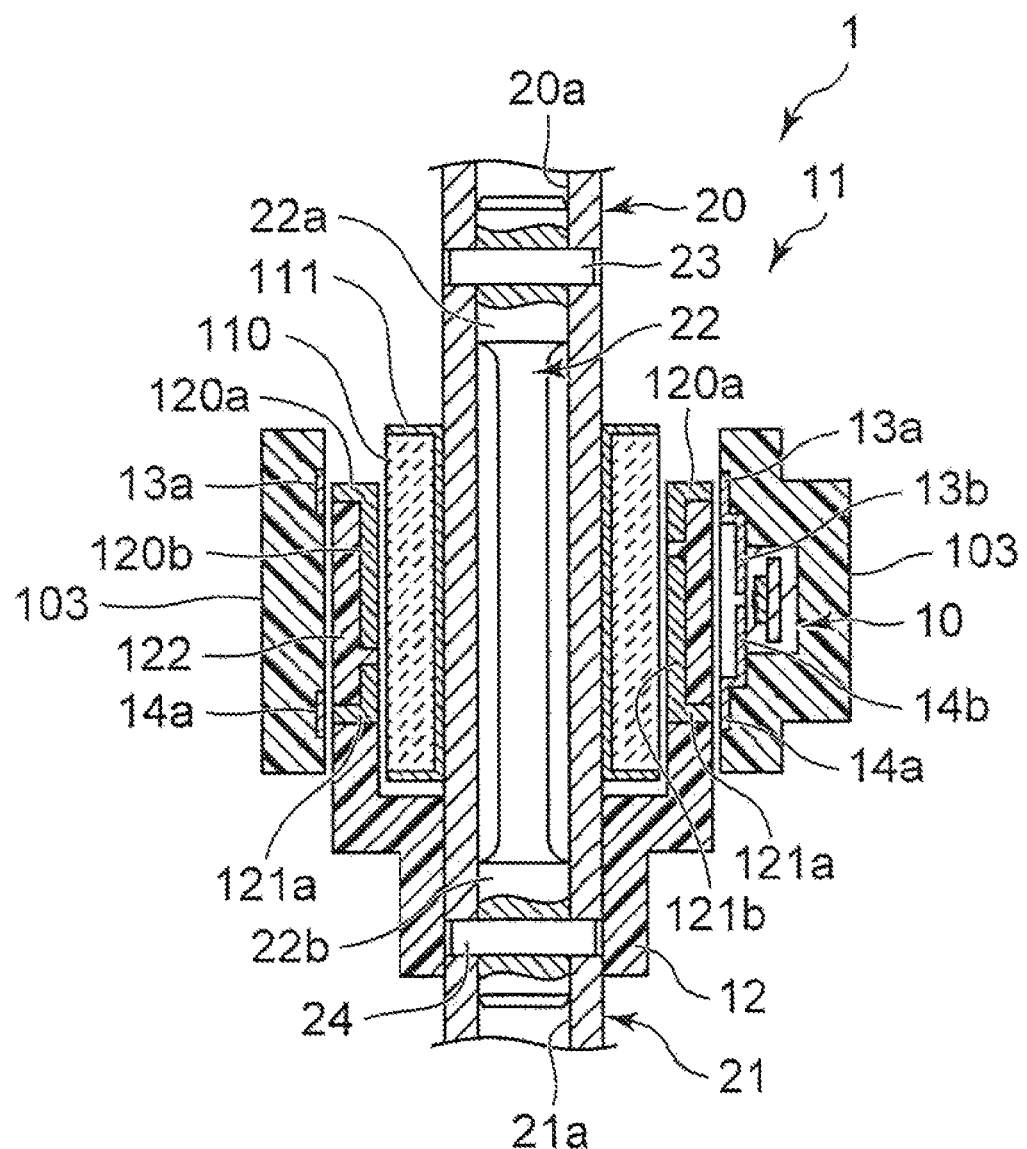
FIG. 3 is a cross-sectional view taken along a cross section passing through a central axis of a steering shaft, which shows a structural example of the torque sensor.

FIG. 2 is an exploded perspective view showing a configuration example of the torque sensor 1 of the first embodiment. FIG. 3 is a cross-sectional view taken along a cross section passing through the central axis of the steering shaft 20, which shows a configuration example of the torque sensor 1.

The torque sensor 1 includes a magnetic detection unit 10 having a Hall IC mounted on a substrate, a cylindrical multipolar magnet portion 11 connected to the steering shaft 20 to be integrally rotated, a magnetic yoke portion 12 disposed within the magnetic field of the multipolar magnet portion 11 and connected to the column shaft 21 to be integrally rotated, and a pair of magnetism collecting plates 13 and 14 magnetically coupled to the magnetic yoke portion 12.

The multipolar magnet portion 11 has a cylindrical multipolar magnet 110, and the multipolar magnet 110 is configured by alternately arranging S-poles 110s and N-poles 110n in the circumferential direction. The multipolar magnet 110 is held by a holding cylinder 111 made of a resin, and the inner periphery of the holding cylinder 111 is fitted to and held by the outer periphery of the steering shaft 20, whereby the multipolar magnet 110 is rotated integrally with the steering shaft 20. The axis of the multipolar magnet 110 and the axis of the steering shaft 20 coincide with each other.

The multipolar magnet 110 is a permanent magnet formed using a material such as ferrite, samarium cobalt, neodymium or the like. As an example, the magnet has an inner diameter of 20 mm, an outer diameter of 30 mm and a height of 10 mm, and the pitch between the S-poles 110s and the N-poles 110n is 2.5 mm, but the sizes can be appropriately changed in accordance with the size and pitch of a pair of magnetic yokes 120 and 121.

The magnetic yoke portion 12 has the pair of magnetic yokes 120 and 121 made of a soft magnetic material and disposed outside the multipolar magnet in the radial direction. The pair of magnetic yokes 120 and 121 are held by a holding cylinder 122 made of a resin, and the inner periphery of the holding cylinder 122 is fitted to and held by the outer periphery of the column shaft 21, whereby the pair of magnetic yokes 120 and 121 are rotated integrally with the column shaft 21. The axes of the pair of magnetic yokes 120 and 121 and the axis of the column shaft 21 coincide with each other. It should be noted that the magnetic yoke portion 12 may be connected to the steering shaft 20, and the multipolar magnet portion 11 may be connected to the column shaft 21.

The pair of magnetic yokes 120 and 121 have annular magnetic yoke bodies 120a and 121a and a plurality of claws 120b and 121b extending in the axial direction from the inner circumferential ends of the magnetic yoke bodies 120a and 121a. The magnetic yoke bodies 120a and 121a are arranged to be separated from each other in the axial direction of the steering shaft 20 and the column shaft 21.

Further, the plurality of claws 120b and 121b are arranged at equal intervals in the circumferential direction of the magnetic yoke bodies 120a and 121a, respectively. The respective claws 120b and 121b of the pair of magnetic yokes 120 and 121 are held by the holding cylinder 122 made of a resin so as to be opposed to each other by being alternately arranged to be displaced at a predetermined pitch in the circumferential direction. The claws 120b and 121b face the outer circumferential surface of the multipolar magnet 110.

The pair of magnetism collecting plates 13 and 14 include annular magnetism collecting plate bodies 13a and 14a and magnetism collecting protrusions 13b and 14b which extend from the magnetism collecting plate bodies 13a and 14a respectively so as to face each other with a gap in the axial direction. The pair of magnetism collecting plates 13 and 14, and the magnetic detection unit 10 are held by a holding cylinder 103 made of a resin. The magnetism collecting plate bodies 13a and 14a each do not need to be perfectly annular and may be semi-annular (not limited to 180° and may be any angle) as long as they can collect the magnetic flux of the pair of magnetic yokes 120 and 121, and thus the shape is not limited to a circular ring-shape.

The steering shaft 20 and the column shaft 21 are connected via a torsion bar 22. The axes of the steering shaft 20, column shaft 21, and torsion bar 22 coincide with one another. One end 22a of the torsion bar 22 is fitted into a coupling hole 20a of the steering shaft 20 and fixed by using a pin 23 so as to rotate together with the steering shaft 20. Further, the other end 22b of the torsion bar 22 is fitted into a coupling hole 21a of the column shaft 21, and is fixed by using a pin 24 so as to rotate together with the column shaft 21.

When a torque is applied to the steering shaft 20 in accordance with the driver's operation of the steering wheel 2, the torque is transmitted to the column shaft 21 via the torsion bar 22, and when the torque is transmitted, torsional deformation occurs on the torsion bar 22 in accordance with the torque. The torsional deformation of the torsion bar 22 causes a relative rotational displacement between the steering shaft 20 and the column shaft 21 in accordance with the torque applied by the driver.

Figure 4A:
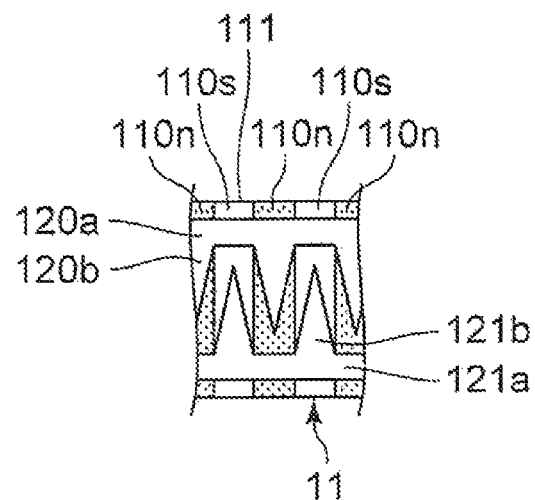
FIGS. 4(a) to 4(c) are front views showing positional relationships between a pair of magnetic yokes and S-poles and N-poles of a multipolar magnet 110.
Figure 4B:
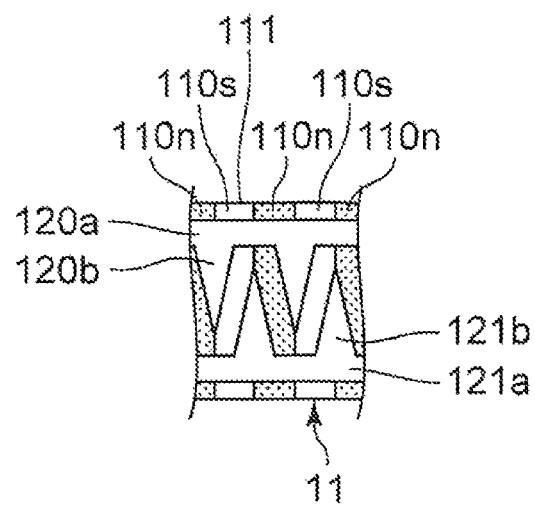
Figure 4C:
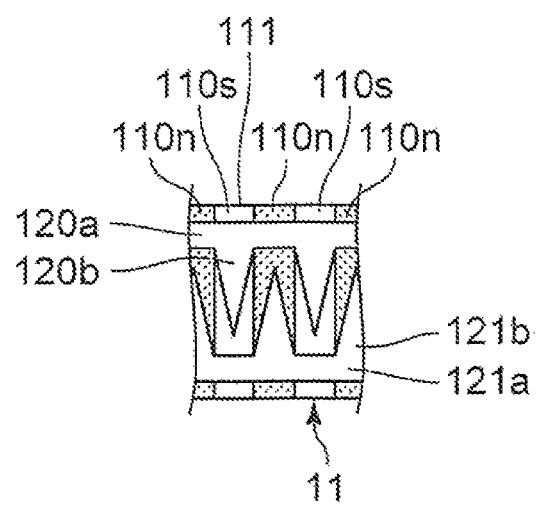

When the relative rotational displacement between the steering shaft 20 and the column shaft 21 occurs, the positional relationship between the claws 120b and 121b of the pair of magnetic yokes 120 and 121 and the S-poles 110s and the N-poles 110n of the multipolar magnet 110 changes as shown in FIGS. 4(a) to 4(c).

FIGS. 4(a) to 4(c) are front views showing the positional relationship between the pair of magnetic yokes 120 and 121 and the S-poles 110s and the N-poles 110n of the multipolar magnet 110.

When there is no relative rotational displacement between the steering shaft 20 and the column shaft 21, that is, when no torque is applied to the steering shaft 20 and the torsion bar 22 is not twisted, the positional relationship between the pair of magnetic yokes 120 and 121 and the multipolar magnet 110 is as shown in FIG. 4(b). Although a magnetic field is generated in the claws 120b and 121b of the magnetic yokes 120 and 121 in this state, no magnetic flux is generated between the magnetic yoke bodies 120a and 121a.

In addition, when relative rotational displacement between the steering shaft 20 and the column shaft 21 occurs, that is, when torque is applied to the steering shaft 20 and the torsion bar 22 is twisted, the positional relationship between the pair of magnetic yokes 120 and 121 and the multipolar magnet 110 is as shown in FIG. 4(a) when the steering wheel 2 is rotated clockwise, and is as shown in FIG. 4(c) when the steering wheel 2 is rotated counterclockwise. In the case of FIG. 4(a) and the case of FIG. 4(c), magnetic fields of magnetic poles opposite to each other are generated in the claws 120b and 121b of the magnetic yokes 120 and 121 and positive or negative magnetic flux is generated between the magnetic yoke bodies 120a and 121a.

Figure 5:
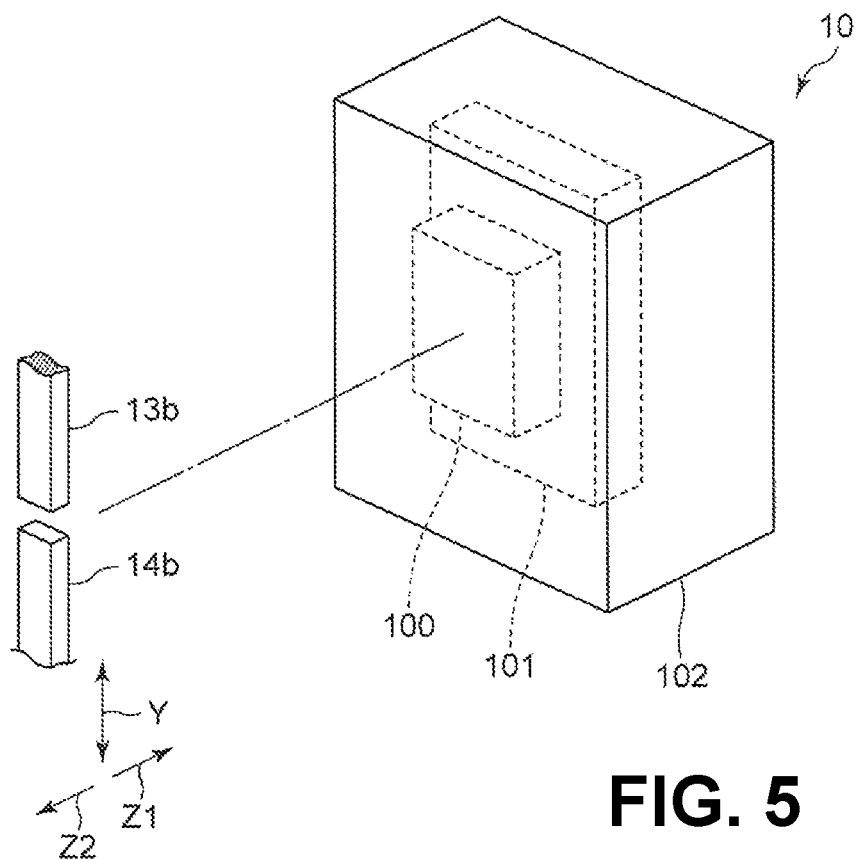
FIG. 5 is a perspective view showing a positional relationship between magnetism collecting protrusions and a magnetic detection unit.
Figure 6:
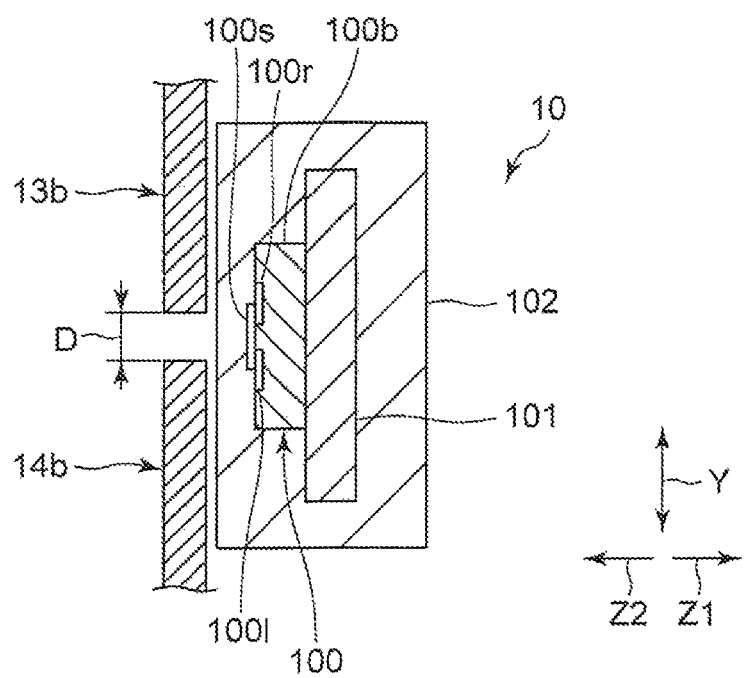
FIG. 6 is a cross-sectional view taken along a yz plane showing the positional relationship between the magnetism collecting protrusions and the magnetic detection unit.

Lines of magnetic force of the magnetic yokes 120 and 121 are collected by the magnetism collecting plates 13 and 14, respectively, and the magnetic flux generated between the magnetic yoke bodies 120a and 121a is collected between the magnetism collecting protrusions 13b and 14b. The magnetic flux between the magnetism collecting protrusions 13b and 14b is detected by the magnetic detection unit 10. FIGS. 5 and 6 show the positional relationship between the magnetism collecting protrusions 13b and 14b and the magnetic detection unit 10.

FIG. 5 is a perspective view showing the positional relationship between the magnetism collecting protrusions 13b and 14b and the magnetic detection unit 10. FIG. 6 is a cross-sectional view taken along a yz plane showing the positional relationship between the magnetism collecting protrusions 13b and 14b and the magnetic detection unit 10.

The magnetic detection unit 10 includes a Hall IC 100 having two Hall plates 100l and 100r and a magnetic concentrator 100s which is a soft magnetic material plate provided so as to overlap the two Hall plates 100l and 100r in an xy plane, a substrate 101 on which the Hall IC 100 is subjected to surface mounting, and a sealing material 102 for molding the Hall IC and the substrate 101. The magnetic detection unit 10 detects the magnetic flux density By in the y direction. It should be noted that the sealing material 102 may be omitted according to the specifications and the installation situation of the torque sensor 1.

The magnetism collecting protrusions 13b and 14b are provided with a distance D in the gap between the tips thereof. The magnetic detection unit 10 is disposed such that the center of the xy plane coincides with the position of the gap between the magnetism collecting protrusions 13b and 14b. The distance between the magnetic detection unit 10 and the magnetism collecting protrusions 13b and 14b may be as small as possible and may be in contact with each other, because the smaller the distance between the magnetic detection unit 10 and the magnetism collecting protrusions 13b and 14b is, the greater the magnetic flux density to be detected becomes. The distance D can be set independently of the thicknesses of the Hall IC 100, substrate 101, and sealing material 102, and may be smaller than the thicknesses of the Hall IC 100, substrate 101, and sealing material 102. As an example, the distance D is set to 2 mm.

Figure 7A:
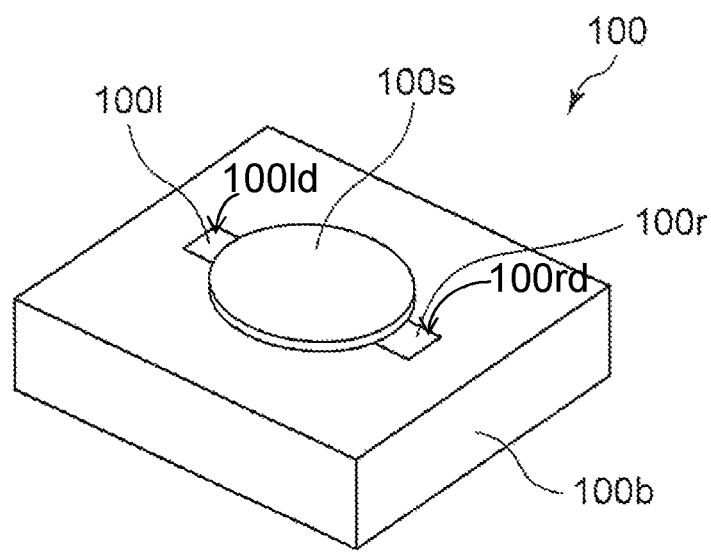
FIGS. 7(a) to 7(c) are a perspective view, plane view, and cross-sectional view showing a configuration of a Hall IC.
Figure 7B:
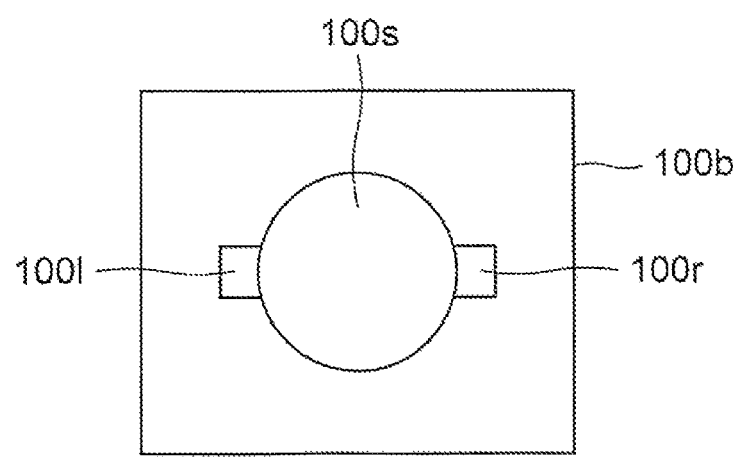
Figure 7C:
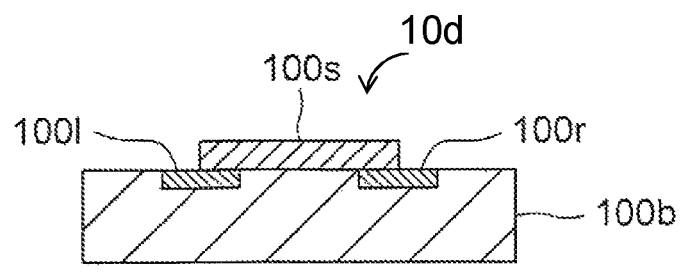

FIGS. 7(a) to 7(c) are a perspective view, plane view and cross-sectional view showing the configuration of the Hall IC 100.

The Hall IC 100 includes a substrate 100b, a Hall plate 100l and a Hall plate 100r provided on the substrate 100b and having a detection surface 100ld, 100rd parallel to the surface of the substrate 100b and a detection direction that is the direction normal to the surface of the substrate 100b as the magnetic detection element, a magnetic concentrator 101s which is provided on the substrate 100b so as to partially overlap the Hall plates 100l and 100r and converts a magnetic flux in a direction perpendicular to the normal direction into a magnetic flux in the normal direction and allows the Hall plates 100l and 100r to detect the magnetic flux, and a signal processing unit (not shown) for processing signals output from the Hall plates 100l and 100r, and detects the magnetic flux densities in the normal direction and the direction perpendicular to the normal direction by signal processing to be described next.

Figure 8:
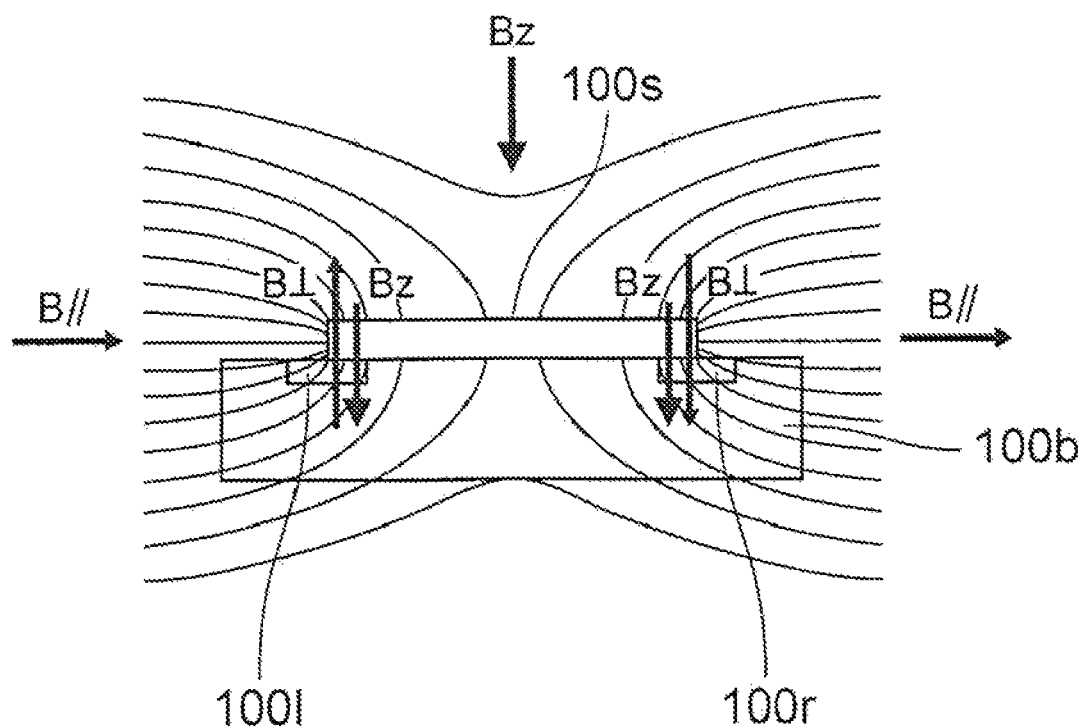
FIG. 8 is a schematic cross-sectional view for illustrating a magnetic flux detecting operation of a Hall IC.

FIG. 8 is a schematic cross-sectional view for illustrating the magnetic flux detecting operation of the Hall IC 100.

In the Hall IC 100, the Hall plates 100*l* and 100*r* detect the magnetic flux density in the vertical direction in the drawing, and thus when the horizontal direction component in the drawing of the magnetic flux f is B//(By) and the vertical direction component in the drawing is Bz, since the drawing horizontal direction component B// is guided by the magnetic concentrator 100*s* and detected as B⊥, the Hall plate 100*l* detects "B⊥–Bz" and the Hall plate 100*r* detects "–B⊥–Bz".

Therefore, the signal processing unit of the Hall IC 100 outputs a signal proportional to the magnetic flux density 2B⊥ based on the difference between the outputs of the Hall plates 100*l* and 100*r*, and outputs a signal proportional to the magnetic flux density –2Bz based on the sum of the outputs of the Hall plates 100*l* and 100*r*. In the present embodiment, the Hall IC 100 primarily detects the drawing horizontal direction component B//(By) of the magnetic flux f, and outputs the signal proportional to the magnetic flux density 2B⊥(By) based on the difference between the outputs of the Hall plates 100*l* and 100*r* to the ECU 4.

For the Hall IC 100, for example, MLX 91372 manufactured by Melexis NV is used. The distance between the Hall plates 100*l* and 100*r* is 0.5 mm, the thickness of the substrate 100*b* is 1.5 mm, the width in the y direction is 4.1 mm, and the width in the x direction is 3 mm. For the magnetic concentrator 100*s*, permalloy can be used. Further, the Hall IC 100 may be further provided with a pair of Hall plates for detecting the magnetic flux density in the x direction.

Figure 9:
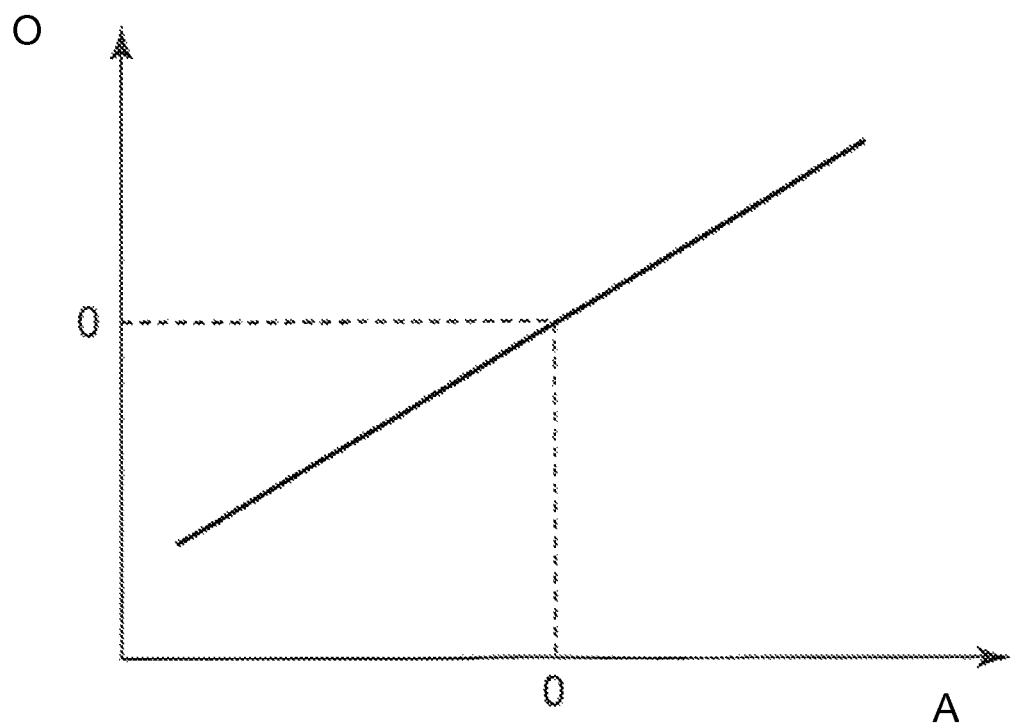
FIG. 9 is a schematic diagram showing the relationship between the angle of torsional deformation of a torsion bar and the output of the Hall IC.

FIG. 9 is a schematic diagram showing the relationship between the angle of rotational displacement of the torsional deformation of the torsion bar 22 and the output of the Hall IC 100.

As described in FIGS. 4(*a*) to 4(*c*), in the case where the torsion bar 22 is not twisted, the positional relationship between the pair of magnetic yokes 120 and 121 and the multipolar magnet 110 is as shown in FIG. 4(*b*) so that no magnetic flux is generated between the magnetic yoke bodies 120*a* and 121*a*. Therefore, the output of the Hall IC 100 corresponds to the case where the magnetic flux density By=0.

Further, when a torque is applied to the steering shaft 20 and the torsion bar 22 is twisted, since the positional relationship between the pair of magnetic yokes 120 and 121 and the multipolar magnet 110 is as shown in FIG. 4(*a*) or 4(*c*) depending on the direction of twisting, positive or negative magnetic flux is generated between the magnetic yoke bodies 120*a*, 121*a*. Therefore, the output of the Hall IC 100 corresponds to the case of the positive magnetic flux or the case of the negative magnetic flux.

Since an output proportional to the magnitude of the magnetic flux is obtained between FIG. 4(*a*) and FIG. 4(*b*), and between FIG. 4(*b*) and FIG. 4(*c*), the relationship between the angle (A) of torsional deformation of the torsion bar 22 and the output (0) of the Hall IC 100 becomes a proportional relationship as shown in FIG. 9.

Effect of First Embodiment

According to the above-described embodiment, since the normal direction of the detection surface of the conventional Hall IC is the magnetism sensing direction, it is necessary to sandwich the Hall IC between the magnetism collecting plates; however, in the present embodiment, the Hall IC 100 capable of detecting also the magnetic flux parallel to the detection surface 10*d* is used to detect the magnetic flux between the magnetism collecting protrusions 13*b* and 14*b*, so that the distance between the magnetism collecting protrusions 13*b* and 14*b* can be set to be narrower than at least the thickness of the Hall IC 100. That is, it is possible that the thicknesses of the Hall IC 100, the materials for mounting the Hall IC 100 such as the substrate 101 and the sealing material 102 do not affect the sensitivity of detecting the magnetic flux generated between the magnetic yoke bodies 120*a* and 121*a*.

Further, since the distance between the magnetism collecting protrusions 13*b* and 14*b* can be made narrower than the thickness of the Hall IC 100, the magnetic flux density between the magnetism collecting protrusions 13*b* and 14*b* increases and the sensitivity of the torque sensor 1 can be improved. In addition, since the magnetic flux density between the magnetism collecting protrusions 13*b* and 14*b* increases, the multipolar magnet 110 can be downsized or thinned for achieving the same sensitivity as in prior arts.

Further, unlike the prior arts, since there is no need to provide protrusions 13*c* and 14*c* extending in the radial direction (FIGS. 18 to 25) and the Hall IC 100 is arranged with the normal line of the detection surface 10*d* in the radial direction of the steering shaft 20, the size of the torque sensor 1 in the radial direction can be suppressed as compared with the conventional size.

It is to be noted that since the distance between the magnetism collecting protrusions 13*b* and 14*b* is made small, assemble accuracy for the Hall IC 100 become required; however, the assembling error may be eliminated by providing the Hall IC 100 with a correction function in the signal processing unit. For example, the correction function performs the correction by programming of the optimum value of the sensitivity and the offset in the signal processing unit of the Hall IC 100. (Alternatively, after mounting the Hall IC 100 to the torque sensor 1, the torsion bar 22 is twisted to the right and left, and the sensitivity and the offset are determined from the magnetic flux density at that time, and then correction is performed by programming in the signal processing unit of the Hall IC 100.)

Second Embodiment

The second embodiment is different from the first embodiment in that the pair of magnetism collecting plates 13 and 14 are omitted. Further, according to the omission of the pair of magnetism collecting plates 13 and 14, changes are added to the multipolar magnet portion and the magnetic yoke portion.

Figure 10:
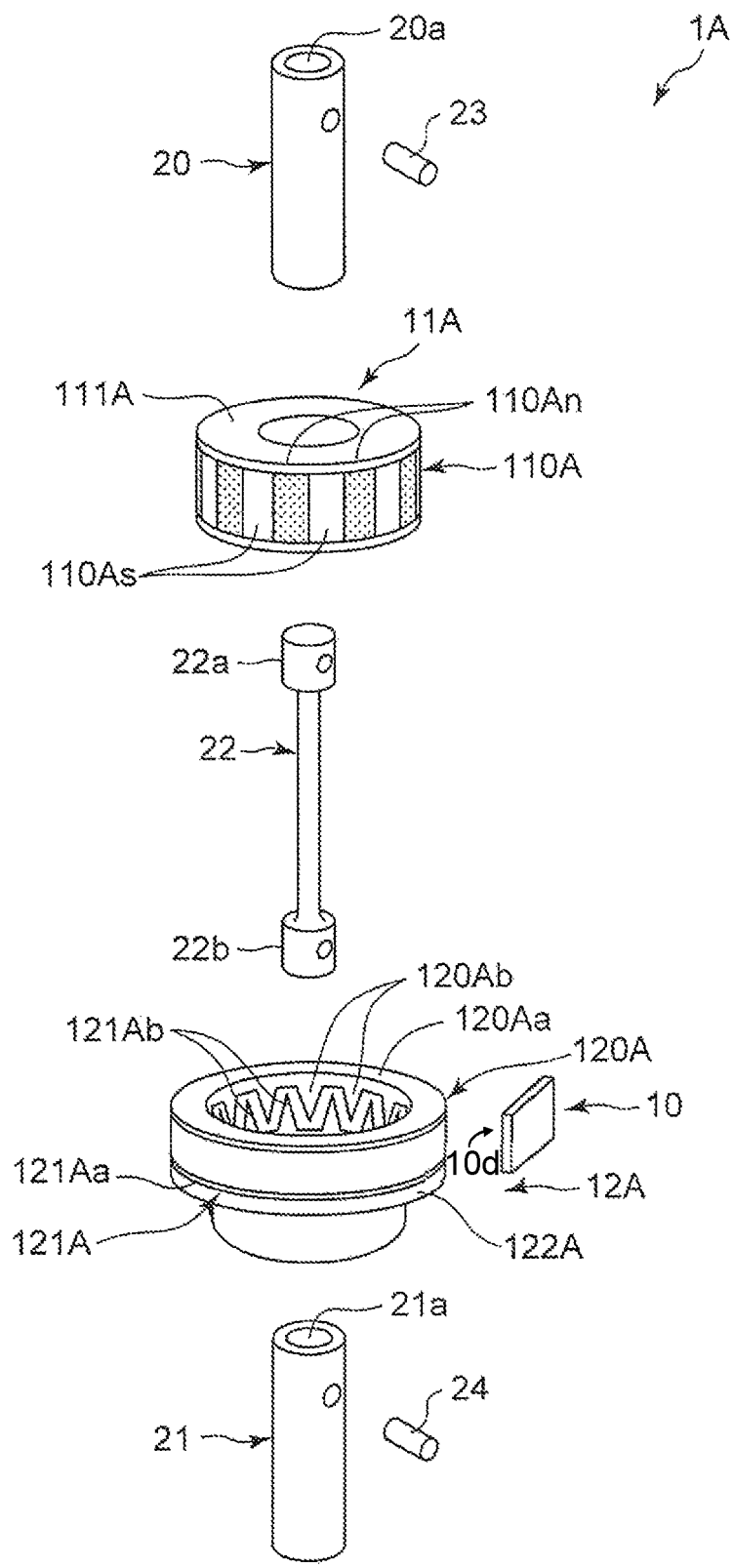
FIG. 10 is an exploded perspective view showing a configuration example of a torque sensor according to a second embodiment.
Figure 11:
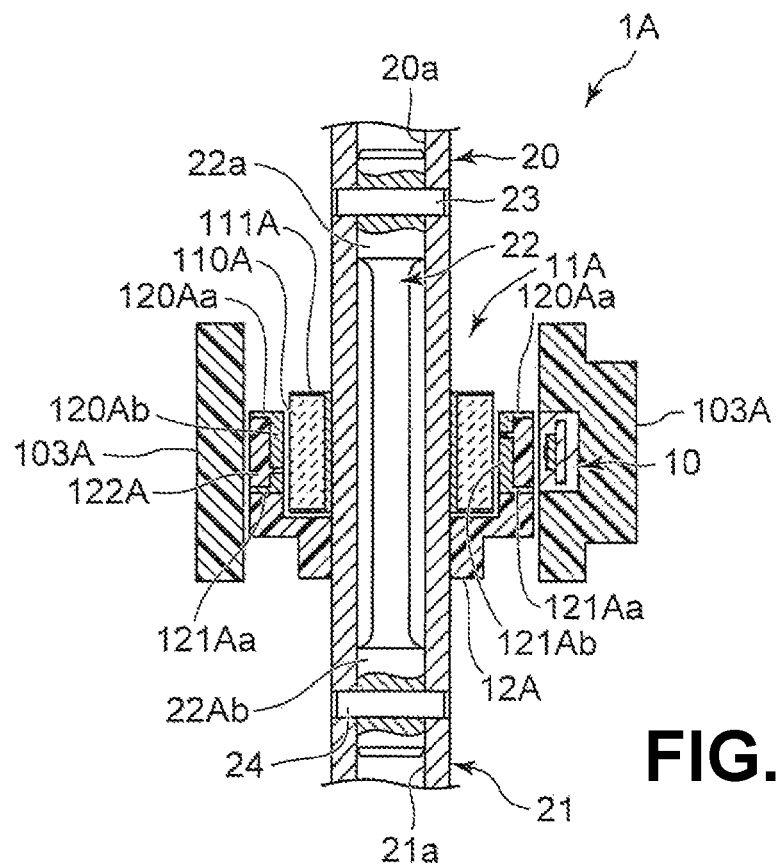
FIG. 11 is a cross-sectional view taken along a cross section passing through the central axis, which shows a configuration example of the torque sensor.

FIG. 10 is an exploded perspective view showing a configuration example of the torque sensor of the second embodiment. Further, FIG. 11 is a cross-sectional view taken along a cross section passing through the central axis and showing a configuration example of the torque sensor.

A torque sensor 1A includes the magnetic detection unit 10 having a Hall IC mounted on a substrate, a cylindrical multipolar magnet portion 11A integrally rotated with the steering shaft 20, and a magnetic yoke portion 12A disposed within the magnetic field of the multipolar magnet portion 11A and integrally rotated with the column shaft 21.

The multipolar magnet portion 11A is obtained by reducing the axial ratio of the multipolar magnet portion 11 of the first embodiment and has a cylindrical multipolar magnet 110A, and the multipolar magnet 110A has S-poles 110A*s* and N-poles 110A*n* arranged alternately in the circumferential direction. The multipolar magnet 110A is held by a holding cylinder 111A made of a resin, and integrally rotated with the steering shaft 20 because the inner periphery of the holding cylinder 111A is fitted to and held by the outer periphery of the steering shaft 20. The axis of the multipolar magnet 110A and the axis of the steering shaft 20 coincide with each other.

The magnetic yoke portion 12A is obtained by shortening the axial length of the multipolar magnet portion 11 of the first embodiment and includes a pair of magnetic yokes 120A and 121A made of a soft magnetic material and disposed outside the multipolar magnet in the radial direction. The pair of magnetic yokes 120A and 121A are held by a holding cylinder 122A made of a resin, and rotated integrally with the column shaft 21 because the inner periphery of the holding cylinder 122A is fitted to and held by the outer periphery of the column shaft 21. The axes of the pair of magnetic yokes 120A and 121A and the axis of the column shaft 21 coincide with each other.

The pair of magnetic yokes 120A and 121A have annular magnetic yoke bodies 120Aa and 121Aa and a plurality of claws 120Ab and 121Ab extending in the axial direction from the inner circumferential ends of the magnetic yoke bodies 120Aa and 121Aa. The magnetic yoke bodies 120Aa and 121Aa are arranged to be separated from each other in the axial direction of the steering shaft 20 and the column shaft 21. In addition, the plurality of claws 120Ab and 121Ab are arranged at equal intervals in the circumferential direction of the magnetic yoke bodies 120Aa and 121Aa, respectively. The respective claws 120Ab and 121Ab of the pair of magnetic yokes 120A and 121A are held by the holding cylinder 122A made of a resin so as to be opposed to each other by being alternately arranged to be displaced at a predetermined pitch in the circumferential direction. The claws 120Ab and 121Ab face the outer circumferential surface of the multipolar magnet 110A.

Since the length in the axial direction is made shorter than that in the multipolar magnet portion 11 in the first embodiment, the axial distance between the annular magnetic yoke bodies 120Aa and 121Aa is reduced accordingly.

In order to detect the magnetic flux between the magnetic yoke bodies 120Aa and 121Aa, the magnetic detection unit 10 is disposed with its detection surface 10d opposed to the outer circumferential surface of the magnetic yoke portion 12A.

The change of the positional relationship between the claws 120Ab and 121Ab of the pair of magnetic yokes 120A and 121A and the S-poles 110As and the N-poles 110An of the multipolar magnet 110A when the relative rotational displacement of the steering shaft 20 and the column shaft 21 occurs is the same as that shown in FIGS. 4(a) to 4(c) of the first embodiment.

Figure 12:
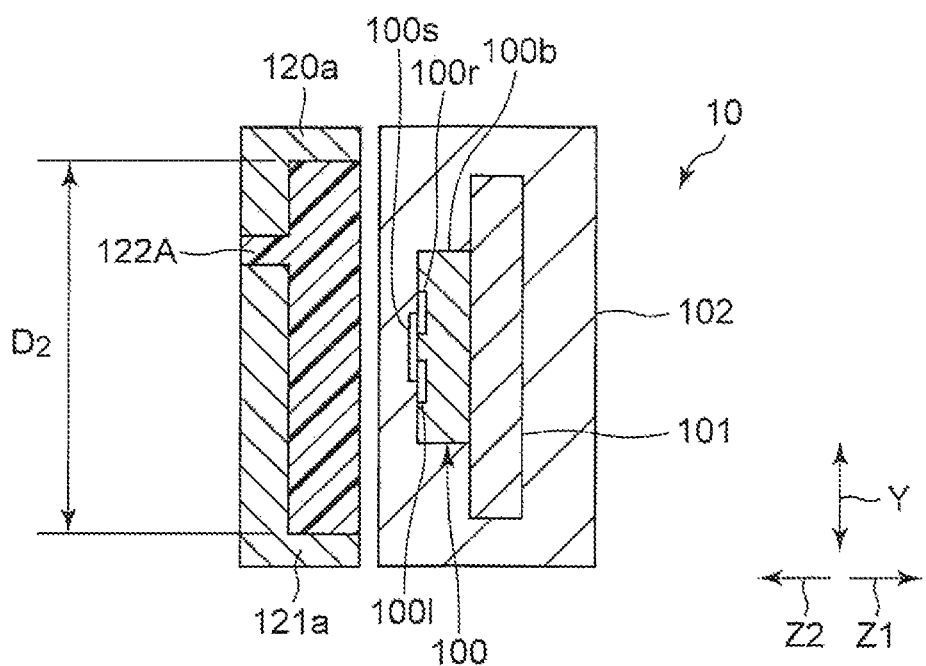
FIG. 12 is a cross-sectional view taken along a yz plane showing the positional relationship between the magnetic yoke body and the magnetic detection unit.

FIG. 12 is a cross-sectional view taken along a yz plane and showing the positional relationship between the magnetic yoke bodies 120Aa and 121Aa and the magnetic detection unit 10.

The magnetic detection unit 10 has the same configuration as the magnetic detection unit 10 according to the first embodiment, and includes the Hall IC 100 having the two Hall plates 100l and 100r and a magnetic concentrator 100s which is a soft magnetic material plate provided so as to overlap the Hall plates 100l and 100r in an xy plane, the substrate 101 on which the Hall IC 100 is subjected to surface mounting, and the sealing material 102 for molding the Hall IC 100 and the substrate 101. The magnetic detection unit 10 detects the magnetic flux density in the y direction.

The magnetic yoke bodies 120Aa and 121Aa have a distance D2 in the gap therebetween. The magnetic detection unit 10 is disposed so that the center of the xy plane coincides with the position of the gap between the magnetic yoke bodies 120Aa and 121Aa. The magnetic flux between the magnetic yoke bodies 120Aa and 121Aa is transmitted to the magnetic concentrator 100s of the Hall IC 100, and the magnetic flux density is detected by the Hall IC 100. The distance D2 can be set independently of the thicknesses of the Hall IC 100, substrate 101 and sealing material 102, and can be smaller than the thicknesses of the Hall IC 100, substrate 101 and sealing material 102, as a matter of course. As an example, the distance D2 is 4 mm. Further, in order to reduce the distance D2 without changing the size of the magnetic yoke portion 12A, the outer circumferential surfaces of the magnetic yokes may be further provided to expand the pair of magnetic yokes 120A and 121A from the outer circumferential side of each of the annular yoke bodies 120Aa and 121Aa so as to approach each other in the axial direction of the steering shaft 20. The outer circumferential surface may be provided over the entire outer periphery or may be provided so as to include a range where the rotation range of the magnetic yoke portion 12A and the installation position of the magnetic detection unit 10 overlap each other.

(Effects of the Second Embodiment)

According to the embodiment described above, since the magnetic concentrator 100s is provided in the Hall IC 100 so that magnetic flux parallel to the detection surface 10d can be detected, the Hall IC 100 can be brought close to the circumferential surface of the magnetic yoke portion 12A, and further, since the axial distance between the magnetic yoke bodies 120Aa and 121Aa is reduced and at the same time the magnetic concentrator 100s of the Hall IC 100 is allowed to induce the magnetic flux, the magnetic flux between the magnetic yoke bodies 120Aa and 121Aa can be sufficiently detected even when the magnetism collecting plate is omitted. In addition, it is possible that the thicknesses of the Hall IC 100 and the materials for mounting the Hall IC 100 such as the substrate 101 and the sealing material 102 do not affect the sensitivity of detecting the magnetic flux generated between the magnetic yoke bodies 120Aa and 121Aa.

Further, similarly to the effect of the first embodiment, the size in the radial direction of the torque sensor 1A can be suppressed as compared with prior arts, and since the sizes in the axial direction of the multipolar magnet portion 11A and the magnetic yoke portion 12A do not depend on the thickness of the magnetic detection unit 10, the size in the axial direction of the torque sensor 1A can be suppressed as compared with prior arts.

That is, in order to detect the magnetic flux between a pair of magnetic yokes spaced apart in the axial direction, a Hall IC that does not include a magnetic concentrator has been conventionally used. However, since the magnetic flux density generated between the magnetic yokes is small and the normal direction of the detection surface is the magnetism sensing direction due to the nature of the Hall IC without a magnetic concentrator, magnetism collecting plates magnetically connected to the magnetic yokes need to be provided so as to sandwich the Hall IC between magnetism collecting protrusions extending from the magnetism collecting plates. Therefore, in the second embodiment, there is provided a torque sensor in which magnetism collecting plates for detecting a magnetic flux between a pair of magnetic yokes spaced apart in the axial direction is omitted.

Other Embodiments

It should be noted that the present invention is not limited to the above embodiments, and various modifications are possible without departing from the spirit of the present invention. For example, the Hall IC 100 may be changed to the one shown below.

Figure 13A:
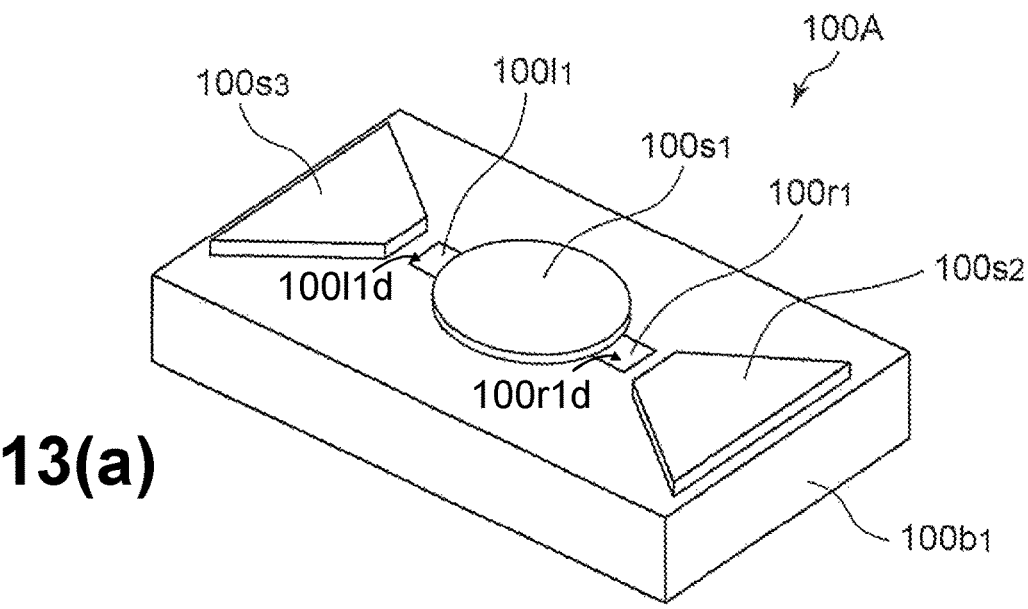
FIGS. 13(a) to 13(c) are a perspective view, plane view and cross-sectional view showing a modification example of the configuration of the Hall IC.
Figure 13B:
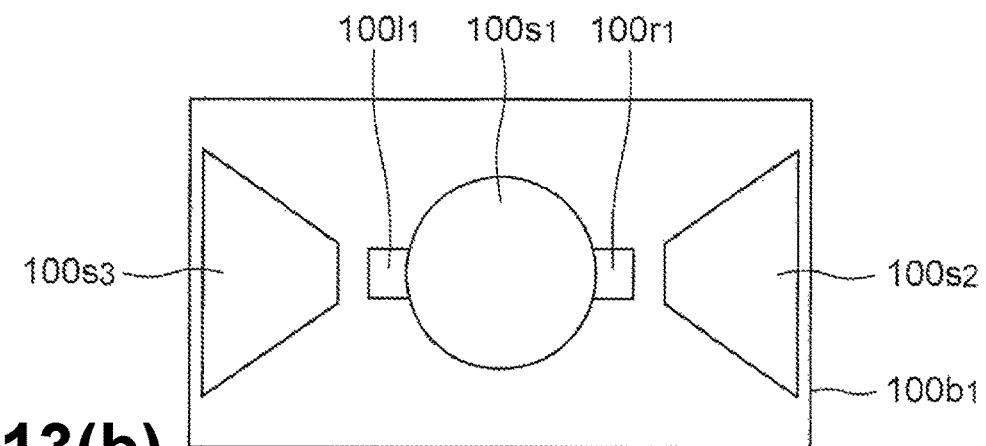
Figure 13C:
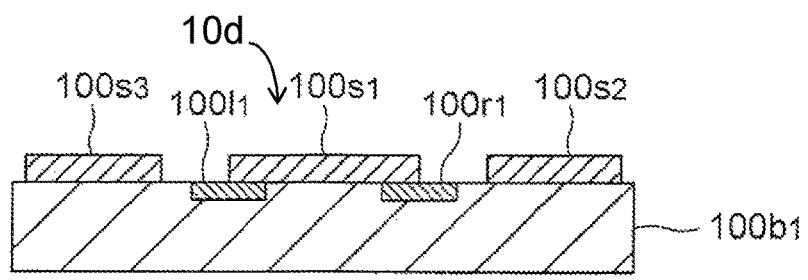

FIGS. 13(a) to 13(c) are a perspective view, plane view and cross-sectional view showing a modification example of the configuration of the Hall IC.

A Hall IC 100A includes a substrate 100b1, a Hall plate 100l1 and a Hall plate 100r1 provided on the substrate 100b1 and having a detection surface 100l1d, 100r1d parallel to the surface of the substrate 100b1 and a detection direction that is the direction normal to the surface of the substrate 100b1 as a magnetic detection element, a magnetic concentrator 101s1 which is provided so as to partially overlap the Hall plates 100l1 and 100r1 and converts a magnetic flux in the direction perpendicular to the normal direction into a magnetic flux in the normal direction to allow the Hall plates 100l1 and 100r1 to detect the magnetic flux, magnetic concentrators 100s2 and 100s3 provided on the substrate 100b1 so as to enclose the Hall plates 100l1 and 100r1 from the outer sides and inducing the magnetic flux in a direction perpendicular to the normal direction to the Hall plates 100l1 and 100r1, a signal processing unit (not shown) for processing signals output from the Hall plates 100l1 and 100r1, and the Hall IC 100A detects the magnetic flux densities in the normal direction and the direction perpendicular to the normal direction.

By using such a Hall IC 100A, the magnetic concentrators 100s2 and 100s3 induce the magnetic flux parallel to the detection surface to the Hall plates 100l1 and 100r1, so that the sensitivity of the torque sensors 1 and 1A can be improved.

In addition, the following Hall IC may be adopted.

Figure 14A:
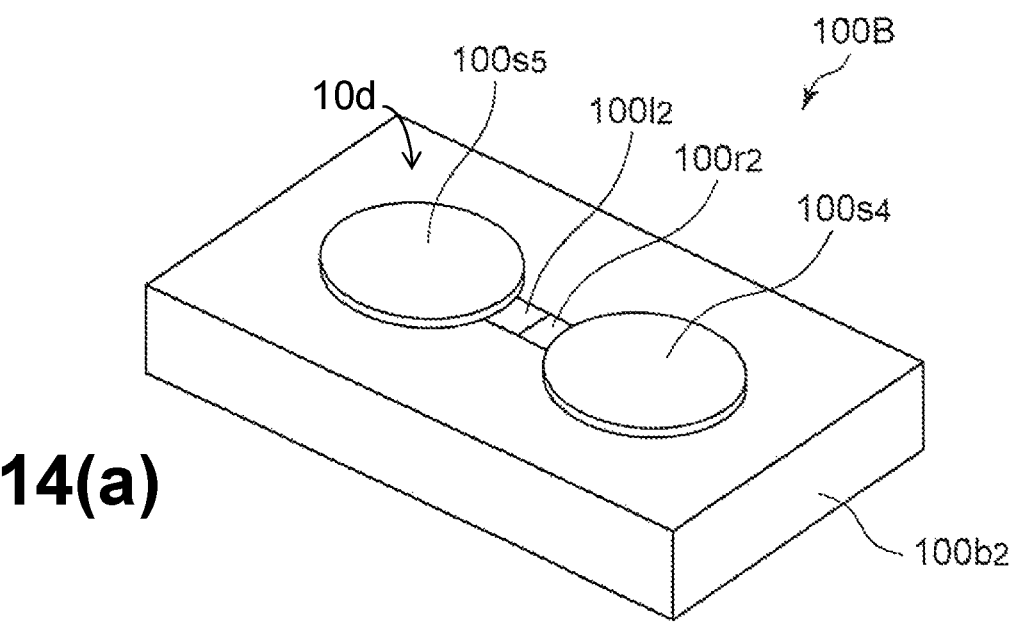
FIGS. 14(a) to 14(c) are a perspective view, plane view and cross-sectional view showing a modification example of the configuration of the Hall IC.
Figure 14B:
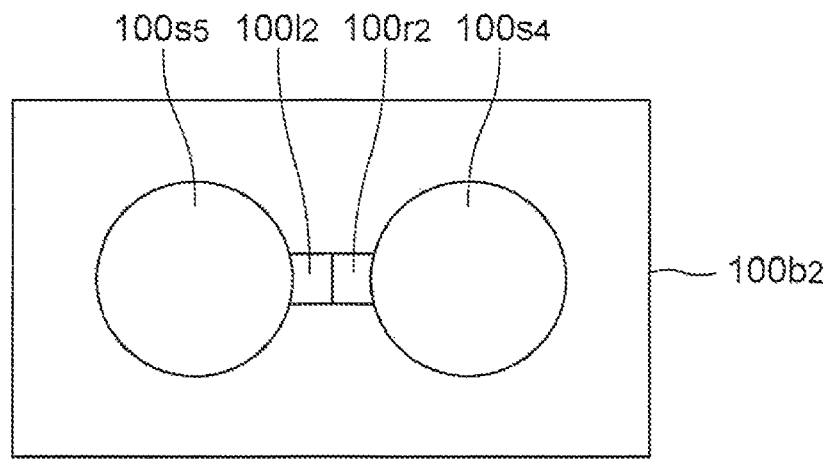
Figure 14C:
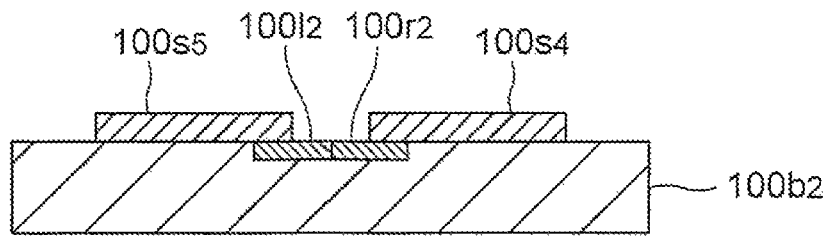

FIGS. 14(a) to 14(c) are a perspective view, plane view and cross-sectional view showing a modification example of the configuration of the Hall IC.

A Hall IC 100B has a substrate 100b2, a Hall plate 100l2 and a Hall plate 100r2 provided on the substrate 100b2 and having a detection surface parallel to the surface of the substrate 100b2 and a detection direction that is the direction normal to the surface of the substrate 100b2 as a magnetic detection element, magnetic concentrators 100s4 and 100s5 provided on the substrate 100b1 so as to enclose the Hall plates 100l1 and 100r1 from the outer sides in order to partially overlap the Hall plates 100l2 and 100r2 and converting the magnetic flux in the direction perpendicular to the normal direction into a magnetic flux in the normal direction to allow the Hall plates 100l2 and 100r2 to detect the magnetic flux, a signal processing unit (not shown) for processing the signals output from the Hall plates 100l2 and 100r2, and detects the magnetic flux densities in the normal direction and the direction perpendicular to the normal direction.

By using such a Hall IC 100B, the magnetic concentrators 100s4 and 100s5 induce the magnetic flux parallel to the detection surface to the Hall plates 100l2 and 100r2, so that the sensitivity of the torque sensors 1 and 1A can be improved.

In addition, the following Hall IC may be adopted.

Figure 15:
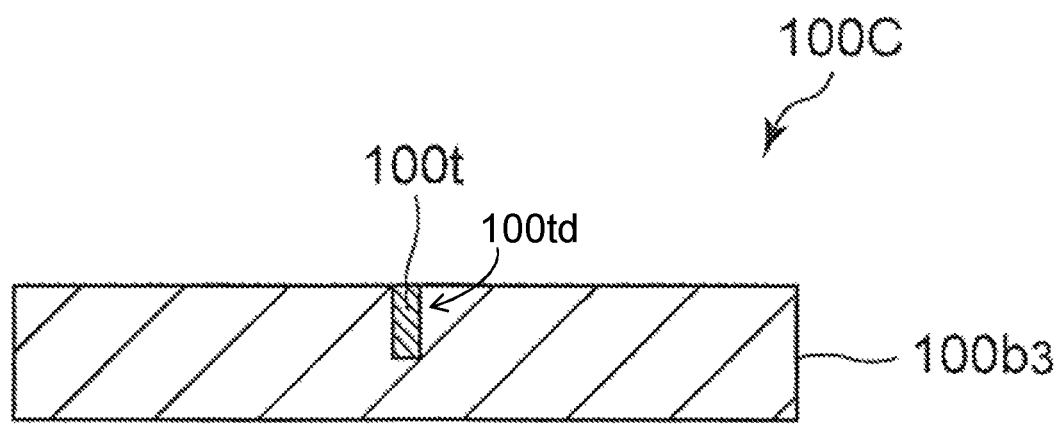
FIG. 15 is a cross-sectional view showing a modification example of the configuration of the Hall IC.

FIG. 15 is a cross-sectional view showing a modification example of the configuration of the Hall IC.

A Hall IC 100C has a substrate 100b3, a Hall plate 100t provided on the substrate 100b3 and having a detection surface 100td perpendicular to the surface of the substrate 100b3 and a detection direction parallel to the surface of the substrate 100b3 as a magnetic detection element and a signal processing unit (not shown) for processing a signal output from the Hall plate 100t, detecting the magnetic flux density in the direction perpendicular to the normal direction.

By using such a Hall IC 100C, it is not necessary to provide magnetic concentrators like the Hall ICs 100, 100A and 100B.

In place of the Hall IC, the following magneto resistance (MR) IC may be adopted.

Figure 16:
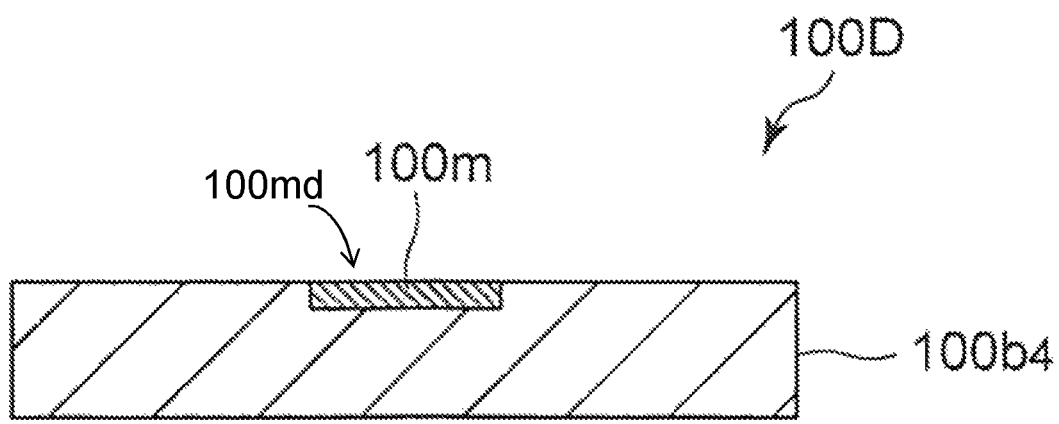
FIG. 16 is a cross-sectional view showing a modification example of the configuration of an MR IC.

FIG. 16 is a cross-sectional view showing a modification example of the configuration of the MR IC.

An MR IC 100D has a substrate 100b4, an MR element 100m provided on the substrate 100b4 and having a detection surface 100md on a surface of the substrate 100b4 and a detection direction parallel to the surface of the substrate 100b4 as a magnetic detection element and a signal processing unit (not shown) for processing a signal output from the MR element 100m, detecting the magnetic flux density in the direction perpendicular to the normal direction.

By using such an MR IC 100D, the torque sensors 1 and 1A can be constituted using the MR element.

In addition, the following Hall IC may be adopted.

Figure 17A:
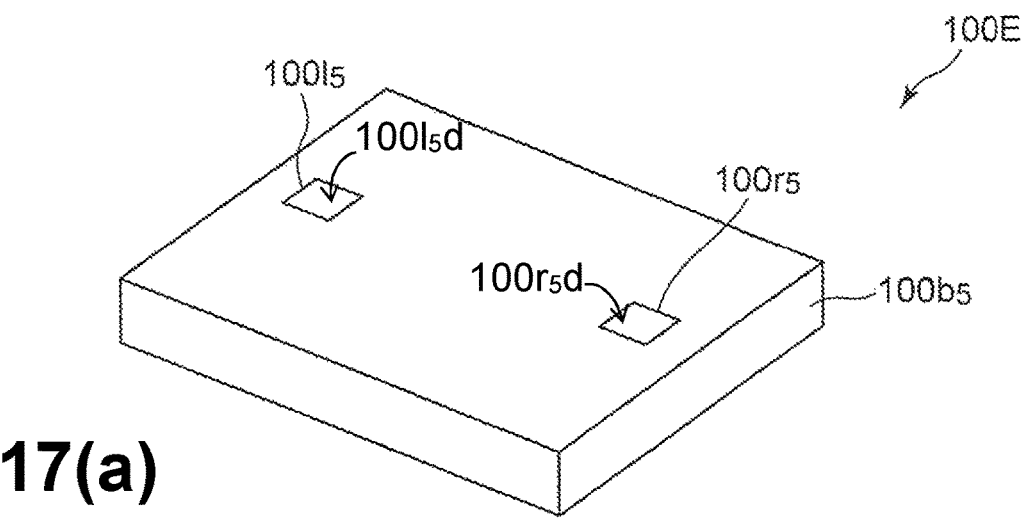
FIGS. 17(a) to 17(c) are a perspective view, plane view, and cross-sectional view showing a modification example of the configuration of the Hall IC.
Figure 17B:
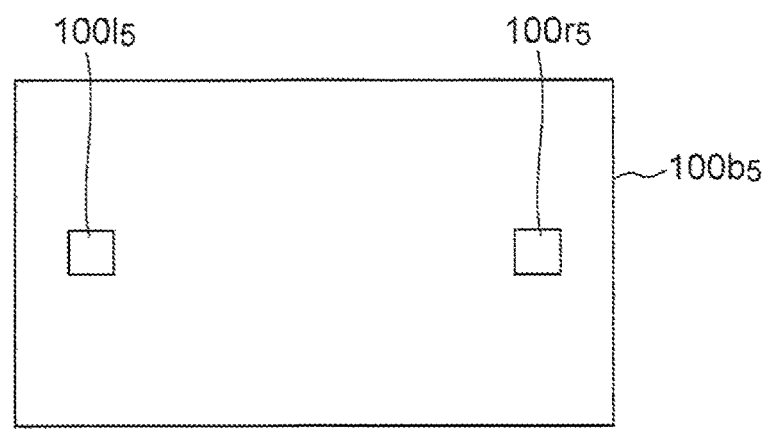
Figure 17C:
Figure 18:
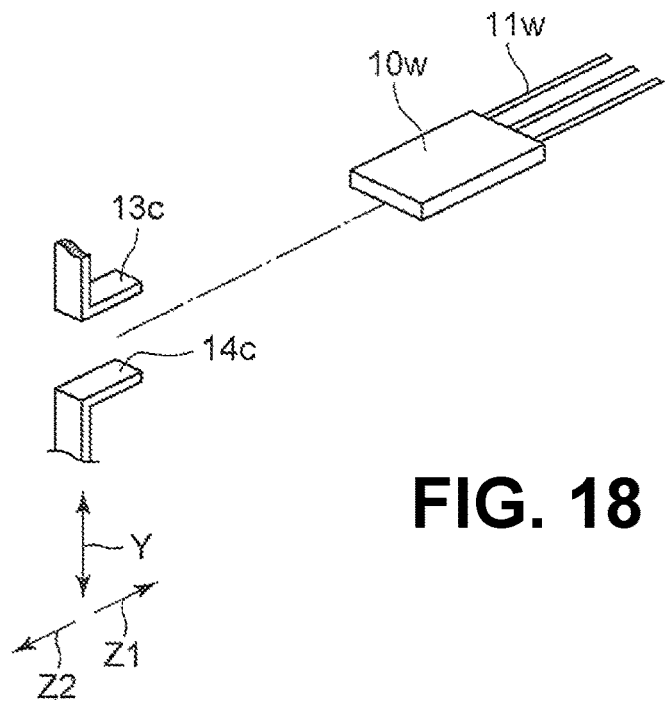
FIG. 18 is a perspective view showing an arrangement relationship between a Hall IC and magnetism collecting elements in a conventional technique.
Figure 19A:
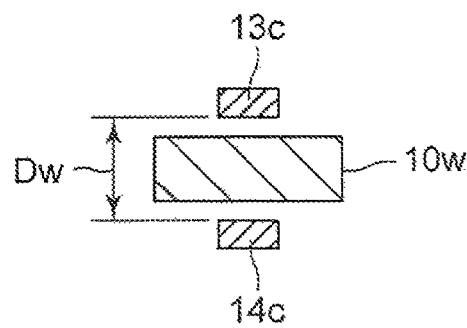
FIGS. 19(a) and 19(b) are a front cross-sectional view and a side cross-sectional view showing the arrangement relationship between the Hall IC and the magnetism collecting elements in the conventional technique.
Figure 19B:
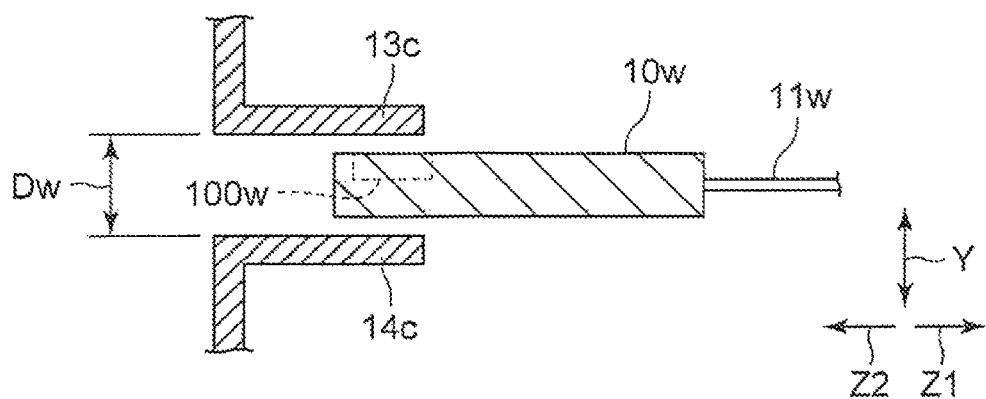
Figure 20:
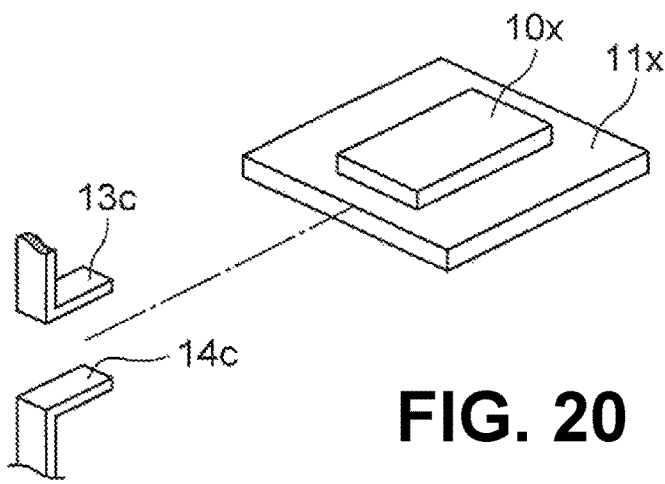
FIG. 20 is a perspective view showing an arrangement relationship between a Hall IC and magnetism collecting elements in a conventional technique.
Figure 21A:
FIGS. 21(a) and 21(b) are a front cross-sectional view and a side cross-sectional view showing the arrangement relationship between the Hall IC and the magnetism collecting elements in the conventional technique.
Figure 21A:
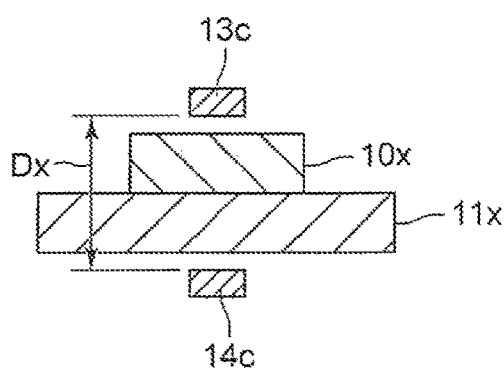
Figure 21B:
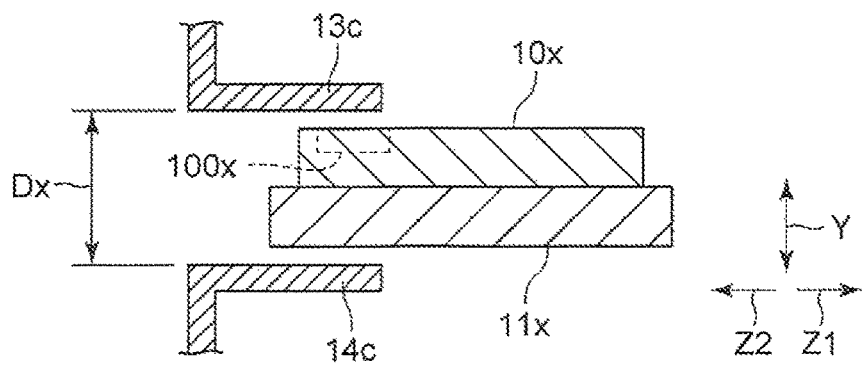
Figure 22:
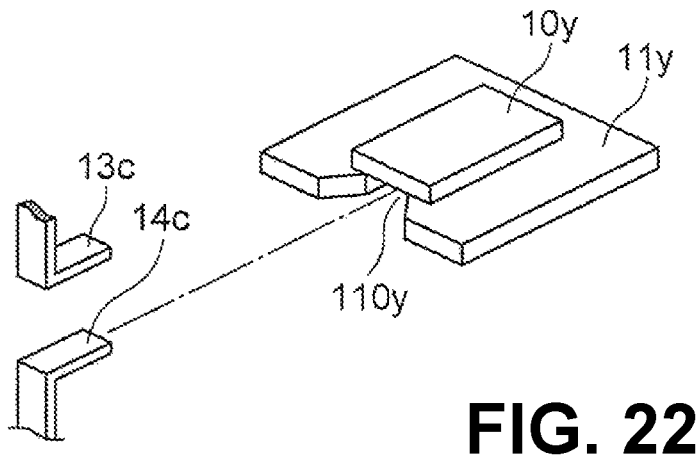
FIG. 22 is a perspective view showing an arrangement relationship between a Hall IC and magnetism collecting elements in a conventional technique.
Figure 23A:
FIGS. 23(a) and 23(b) are a front cross-sectional view and a side cross-sectional view showing the arrangement relationship between the Hall IC and the magnetism collecting elements in the conventional technique.
Figure 23A:
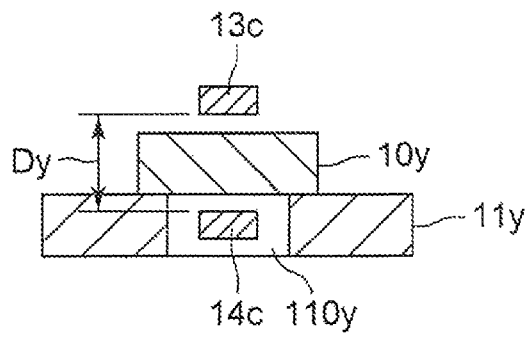
Figure 23B:
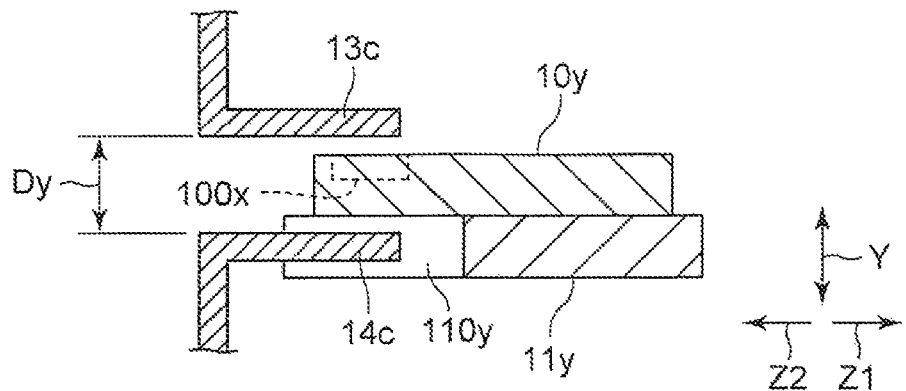
Figure 24:
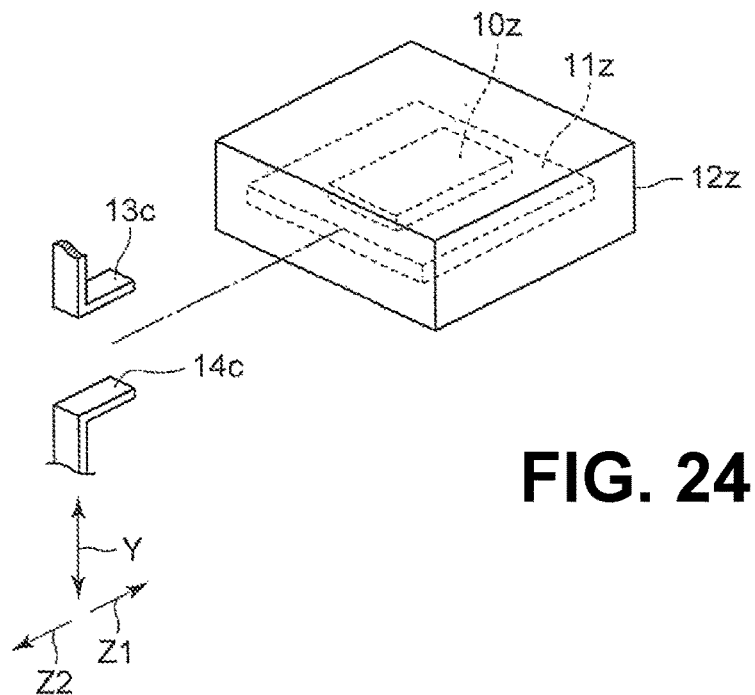
FIG. 24 is a perspective view showing an arrangement relationship between a Hall IC and magnetism collecting elements in a conventional technique.
Figure 25A:
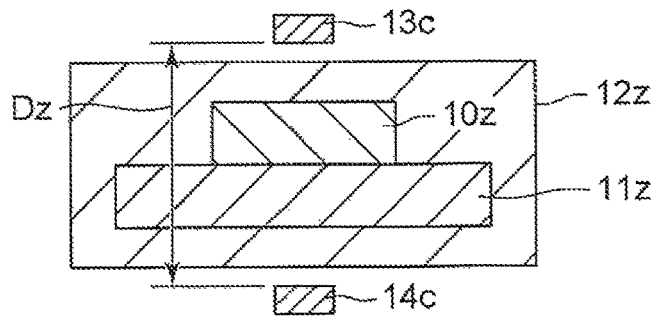
FIGS. 25(a) and 25(b) are a front cross-sectional view and a side cross-sectional view showing the arrangement relationship between the Hall IC and the magnetism collecting elements in the conventional technique.
Figure 25B:
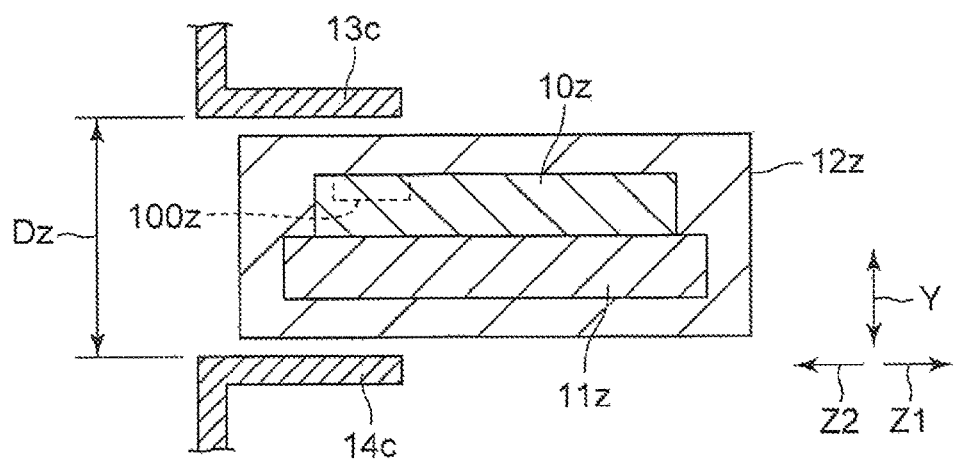

FIGS. 17(a) to 17(c) are a perspective view, plane view and cross-sectional view showing a modification example of the configuration of the Hall IC.

The Hall IC 100E has a substrate 100b5, a Hall plate 100l5 and a Hall plate 100r5 provided on the substrate 100b5 and having a detection surface 100r5d, 100l5d parallel to the surface of the substrate 100b5 and a detection direction normal to the surface of the substrate 100b5 as a magnetic detection element, and a signal processing unit (not shown) for processing the signals output from the Hall plates 100l5 and 100r5, and detects the magnetic flux density in the direction perpendicular to the normal direction by providing the arrangement interval (2 mm as an example) to the Hall plates 100l5 and 100r5, and calculating $\Delta Bz$ from the difference between the signals output from the Hall plates 100l5 and 100r5 in the signal processing unit. It should be noted that in a plane view with the normal line of the plane in a radial direction of the steering shaft 20, the magnetism collecting protrusions 13b and 14b overlap a part of the Hall plate 100l5 and the Hall plate 100r5, respectively.

By using such a Hall IC 100E, since not the magnetic flux density By but the difference $\Delta Bz$ in the magnetic flux densities is calculated, the magnetic flux density in a direction perpendicular to the normal direction can be detected while eliminating the need for a magnetic concentrator.

In addition, the materials and shapes of the sensor, yoke, magnetism collecting plate, and magnet according to the above-described embodiment are examples, and these may be appropriately selected and used as a newly changed combination within a range where the functions of torque detection are not impaired and the gist of the present invention is not changed. Further, the torque sensor 1 (1A) does not need to include all of the magnetic detection unit 10, multipolar magnet portion 11 (11A), magnetic yoke portion 12 (12A), and magnetism collecting plates 13 and 14, and only a part (for example, only the magnetic detection unit 10 and the magnetism collecting plates 13 and 14, or only the magnetic detection unit 10 and the magnetic yoke portion 12A) may be supplied as a product.

Further, the magnetism collecting protrusions 13b and 14b of the magnetism collecting plates 13 and 14 may be eliminated by providing the magnetic concentrator on the substrate similarly to the Hall IC 100A illustrated in FIGS. 13(*a*) to 13(*c*) or the Hall IC 100B illustrated in FIGS. 14(*a*) to 14(*c*), instead of providing the magnetism collecting protrusions 13*b* and 14*b* of the first embodiment.

In a second aspect, the present invention may relate to a method for controlling a torque assisting a driver's steering of a column shaft, comprising:

receiving a first and a second signal output from a first and a second hall plate respectively, calculating the difference between the first and the second signal output, and transferring a detection signal corresponding to this difference to an electric control unit for controlling the torque.

In embodiments, the method may further comprise, after the transferring step, a step of controlling the torque in accordance with the detection signal.

Figure 26:
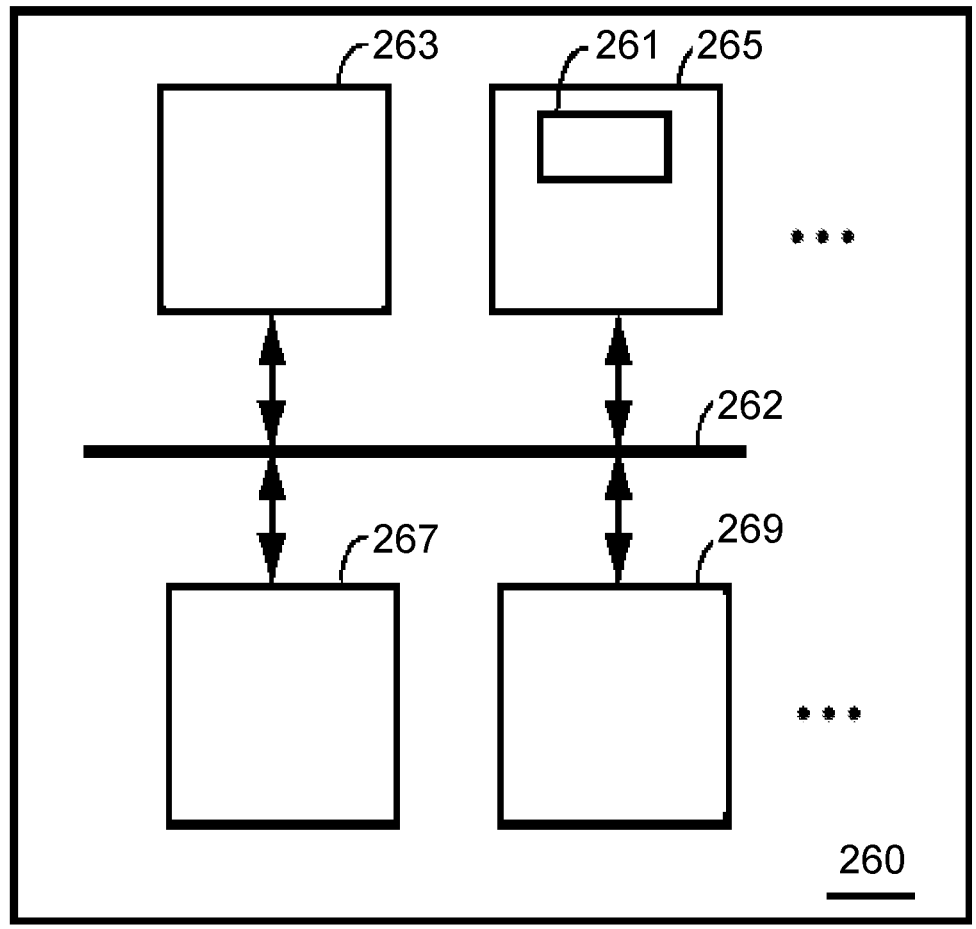
FIG. 26 is a schematic representation of a signal processing unit according to an embodiment of the third aspect.

The above-described method embodiments of the present invention may be implemented in a signal processing unit 260 such as shown in FIG. 26. FIG. 26 shows one configuration of a signal processing unit 260 that includes at least one programmable processor 263 coupled to a memory subsystem 265 that includes at least one form of memory, e.g., RAM, ROM, and so forth. It is to be noted that the processor 263 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem 267 that has at least one input port (e.g. disk drive and/or CD-ROM drive and/or DVD drive and/or USB port and/or SD port, etc . . . ). In some implementations, a display system, a keyboard, and a pointing device may be included as part of a user interface subsystem 269 to provide for a user to manually input information. Ports fo outputting data also may be included. More elements such as network connections, interfaces to various devices, and so forth, may be included, but are not illustrated in FIG. 26. The various elements of the processing system 260 may be coupled in various ways, including via a bus subsystem 262 shown in FIG. 26 for simplicity as a single bus, but will be understood to those in the art to include a system of at least one bus. The memory of the memory subsystem 265 may at some time hold part or all of a set of instructions that when executed on the processing system 260 implement the steps of the method embodiments described herein. Thus, while a processing system 260 such as shown in FIG. 26 is prior art, a system that includes the instructions to implement aspects of the methods for controlling a torque assisting a driver's steering of a column shaft is not prior art, and therefore FIG. 26 is not labelled as prior art.

In a third aspect, the present invention may therefore relate to a signal processing unit adapted to perform the method of the second aspect.

In a fourth aspect, the present invention may also include a computer program or computer program product which provides the functionality of any of the methods according to the present invention when executed on a computing device. Such computer program product can be tangibly embodied in a carrier medium carrying machine-readable code for execution by a programmable processor. The fourth aspect of the present invention may thus relate to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program or computer program product can be carried on an electrical carrier signal. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is to be understood that although preferred embodiments, specific constructions and configurations, as well as materials, have been discussed herein for devices according to the present invention, various changes or modifications in form and detail may be made without departing from the scope and technical teachings of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A torque sensor for sensing the torque applied to a first shaft having a multipolar magnet rotated therewith and being connected to a second shaft via a torsion bar, the torque sensor comprising:
   a pair of magnetic yokes adapted to be disposed in a magnetic field of the multipolar magnet and adapted to be rotated together with the second shaft, and
   a magnetic detection element having a detection surface and being arranged to detect a magnetic flux in a direction parallel to the detection surface.

2. The torque sensor according to claim 1, wherein the pair of magnetic yokes is arranged to generate a first magnetic flux-between the yokes when torque is applied to the first shaft and the torsion bar is twisted, and
   wherein the magnetic detection element is adapted to detect the first magnetic flux.

3. The torque sensor according to claim 1, further comprising a pair of magnetism collectors arranged to collect a first magnetic flux generated between the pair of magnetic yokes.

4. The torque sensor according to claim 3 wherein the pair of magnetism collectors have a pair of magnetism collector bodies for collecting the first magnetic flux and having a pair of protrusions that each extend from each of the pair of magnetism collector bodies to form a gap;
   wherein a second magnetic flux is induced in the gap when the first magnetic flux is present between the pair of magnetic yokes, and
   wherein the magnetic detection element is adapted to detect the first magnetic flux indirectly by detecting the second magnetic flux.

5. The torque sensor according to claim 4 wherein the pair of protrusions are substantially parallel to the detection surface and/or are substantially aligned.

6. The torque sensor according to claim 4, wherein the protrusions each extend perpendicularly from each of the pair of magnetism collector bodies.

7. The torque sensor according to claim 4, wherein the protrusions each extend from each of the pair of magnetism collector bodies in an axial direction of the first shaft when the pair of magnetic yokes is rotated together with the second shaft.

8. The torque sensor according to claim 1, wherein the magnetic detection element is adapted to be disposed, so that a normal line of a detection surface of the magnetic detection element is in a radial direction of the first shaft, so as to be located between the pair of magnetic yokes in a first plane view, a normal line of the first plane being in the radial direction of the first shaft, and so as not to overlap the pair of magnetic yokes in a second plane view, a normal line of the second plane being in an axial direction of the first shaft.

9. The torque sensor according to claim 1, wherein the magnetic detection element includes:
 at least a pair of Hall plates arranged at an interval; and
 a magnetic concentrator overlapping a part of each of the pair of Hall plates in a plane view in a normal direction of the detection surface.

10. The torque sensor according to claim 9, wherein the magnetic detection element further includes a magnetic concentrator at each end of the pair of Hall plates in a plane view in the normal direction of the detection surface.

11. The torque sensor according to claim 1, wherein the magnetic detection element includes:
 at least a pair of Hall plates arranged side by side, and
 a magnetic concentrator provided at each end of the pair of Hall plates so as to overlap a part of each of the pair of Hall plates in a plane view in a normal direction of the detection surface.

12. The torque sensor according to any one of claim 1, wherein the magnetic detection element includes a Hall plate or an MR element, whose detection direction is parallel to the detection surface.

13. The torque sensor according to claim 1, further comprising the multipolar magnet, wherein
 the multipolar magnet has S-poles and N-poles alternately arranged at a predetermined pitch in a circumferential direction of the first shaft when the multipolar magnet is rotated with the first shaft, and
 the pair of magnetic yokes are arranged to be shifted from each other by the predetermined pitch in the circumferential direction.

14. A method for controlling a torque assisting a driver's steering of a column shaft, comprising:
 receiving a first and a second signal output from a first and a second hall plate, respectively, of a magnetic detection element,
 calculating the difference between the first and the second signal output, and
 transferring a detection signal corresponding to this difference to an electric control unit for controlling the torque,
 wherein the magnetic detection element has a detection surface and is arranged to detect a magnetic flux in a direction parallel to the detection surface.

15. A signal processing unit adapted to perform the method of claim 14.

* * * * *